US012476446B2

(12) United States Patent
O'Connell et al.

(10) Patent No.: US 12,476,446 B2
(45) Date of Patent: Nov. 18, 2025

(54) METHOD AND APPARATUS FOR LIFTING A BUNDLE OF SUB-CONDUCTORS

(71) Applicant: Quanta Associates, L.P., Houston, TX (US)

(72) Inventors: Daniel Neil O'Connell, Burnaby (CA); Raymond Henry Jodoin, Burnaby (CA); Benjamin James Harvey, Burnaby (CA); John Christopher Green, Calgary (CA); Stanley Giang, Calgary (CA)

(73) Assignee: Quanta Associates, L.P., Houston, TX (US)

( * ) Notice: Subject to any disclaimer, the term of this patent is extended or adjusted under 35 U.S.C. 154(b) by 941 days.

(21) Appl. No.: 17/200,148

(22) Filed: Mar. 12, 2021

(65) Prior Publication Data

US 2021/0288481 A1 Sep. 16, 2021

Related U.S. Application Data

(60) Provisional application No. 62/989,190, filed on Mar. 13, 2020.

(30) Foreign Application Priority Data

Mar. 12, 2020 (CA) .................................. CA 3093662
Sep. 15, 2020 (CA) .................................. CA 3093146

(51) Int. Cl.
*H02G 7/05* (2006.01)
*H02G 1/02* (2006.01)
(52) U.S. Cl.
CPC ............... *H02G 7/053* (2013.01); *H02G 1/02* (2013.01)

(58) Field of Classification Search
CPC .. H02G 1/00; H02G 1/02; H02G 1/04; H02G 7/00; H02G 7/02; H02G 7/04; H02G 7/053; H02G 7/20; H02G 7/205
(Continued)

(56) References Cited

U.S. PATENT DOCUMENTS 2,264,685 A * 12/1941 Wells ..................... H01B 17/14
174/148
2,786,092 A * 3/1957 Gage ........................ H02G 1/04
242/157 R
(Continued)

FOREIGN PATENT DOCUMENTS

CN 1171862 A 1/1998
DE 102017130190 A1 6/2019
(Continued)

OTHER PUBLICATIONS

Kim, Harry, PCT International Search Report and Written Opinion of the International Searching Authority for PCT/US2021/022141, Jun. 29, 2021, 6 pages, Alexandria, United States of America.
(Continued)

*Primary Examiner* — Monica S Carter
*Assistant Examiner* — Jonathan R Zaworski
(74) *Attorney, Agent, or Firm* — Oathout Law Firm; Antony C. Edwards; Laura Tu

(57) ABSTRACT

A bundle lifter for lifting a sub-conductor bundle having a plurality of spaced-apart sub-conductors, includes a base platform adapted for rotational mounting onto a single point conductor lifter, four sub-conductor wire cages mounted on the platform to support a sub-conductor thereon, each wire cage adapted to releasably hold a single sub-conductor and to swivel relative to the platform, wherein when the wire cages are positioned under the sub-conductor bundle, the wire cages are swivelled to align their corresponding rollers
(Continued)

with a corresponding sub-conductor for rolling support of the sub-conductor on the roller as the bundle lifter is elevated on the support upwards from under the sub-conductor bundle to simultaneously pick each sub-conductor in the bundle into its wire cage for translation of the bundle from an original position to a new position spaced apart from the original position.

14 Claims, 28 Drawing Sheets

(58) Field of Classification Search
USPC .............. 254/134.3 PA, 124.3 CL, 134.3 R
See application file for complete search history.

(56) References Cited

U.S. PATENT DOCUMENTS

| | | | | | |
|---|---|---|---|---|---|
| 3,012,756 | A | * | 12/1961 | Cronkright | H02G 1/04 174/40 R |
| 3,077,337 | A | * | 2/1963 | Cronkright | H02G 1/04 254/394 |
| 3,103,345 | A | * | 9/1963 | Eitel | H02G 1/04 182/2.1 |
| 3,170,673 | A | * | 2/1965 | McAuley | H02G 1/04 254/134.3 PA |
| 3,195,862 | A | * | 7/1965 | Sherman | H02G 1/04 254/390 |
| 3,407,011 | A | * | 10/1968 | Zeidler | F16C 29/045 384/54 |
| 3,814,838 | A | * | 6/1974 | Shafer | H01B 17/14 174/150 |
| 4,466,506 | A | * | 8/1984 | Dolenti | H02G 1/02 254/133 R |
| 5,040,771 | A | * | 8/1991 | Spell | H02G 1/04 254/134.3 CL |
| 5,221,074 | A | * | 6/1993 | Saracini | H02G 1/04 254/134.3 PA |
| 5,538,207 | A | * | 7/1996 | O'Connell | H02G 1/04 182/2.11 |
| 5,573,226 | A | * | 11/1996 | Smith | B65H 57/14 242/615.3 |
| 5,599,005 | A | * | 2/1997 | Sauber | H02G 1/04 254/134.3 PA |
| 5,725,200 | A | * | 3/1998 | Gordon | B63H 9/10 242/157 R |
| 6,517,052 | B1 | * | 2/2003 | Lake | H02G 1/06 254/134.3 R |
| 6,837,671 | B2 | * | 1/2005 | Devine | H02G 1/04 414/680 |
| 7,535,132 | B2 | * | 5/2009 | Devine | H02G 1/02 174/68.2 |
| 8,226,069 | B2 | * | 7/2012 | Devine | H02G 1/04 182/2.1 |
| 8,505,878 | B2 | * | 8/2013 | Barthold | H02G 1/04 254/214 |
| 8,573,562 | B2 | * | 11/2013 | Devine | H02G 1/02 174/40 R |
| 8,585,020 | B2 | * | 11/2013 | Devine | H02G 1/04 254/134.3 R |
| 8,684,333 | B2 | * | 4/2014 | Devine | H02G 1/04 182/2.1 |
| 8,714,525 | B2 | * | 5/2014 | Lessard | H02G 1/02 294/174 |
| 8,895,861 | B2 | * | 11/2014 | Cotton | H02G 7/053 174/45 R |
| 9,038,989 | B2 | * | 5/2015 | Devine | H02G 1/04 182/2.1 |
| 9,112,338 | B2 | * | 8/2015 | Devine | H02G 1/02 |
| 9,203,219 | B2 | * | 12/2015 | Devine | H02G 1/04 |
| 9,444,240 | B2 | * | 9/2016 | Argyle | H02G 7/12 |
| 9,938,117 | B2 | * | 4/2018 | Fritel | B66C 1/10 |
| 10,027,101 | B2 | * | 7/2018 | Girlando | H01H 31/023 |
| 10,177,545 | B2 | * | 1/2019 | O'Connell | H02G 1/02 |
| 10,242,830 | B2 | * | 3/2019 | O'Connell | H01H 71/0264 |
| 10,748,728 | B2 | * | 8/2020 | O'Connell | H01H 71/10 |
| 11,870,233 | B2 | * | 1/2024 | Gibel | H02G 1/02 |
| 2008/0246010 | A1 | * | 10/2008 | Barthold | H02G 1/04 254/134.3 R |
| 2011/0011987 | A1 | * | 1/2011 | Lessard | H02G 1/02 248/49 |
| 2014/0138145 | A1 | * | 5/2014 | Argyle | H02G 7/12 174/40 R |
| 2015/0014050 | A1 | * | 1/2015 | Tufari | H02G 7/125 174/40 CC |
| 2015/0325985 | A1 | * | 11/2015 | O'Connell | H02G 1/02 254/134.3 R |
| 2017/0287665 | A1 | * | 10/2017 | O'Connell | H01H 71/0264 |
| 2019/0123525 | A1 | * | 4/2019 | O'Connell | H02G 1/02 |
| 2019/0221393 | A1 | * | 7/2019 | O'Connell | H01H 71/0264 |

FOREIGN PATENT DOCUMENTS

| | | |
|---|---|---|
| JP | 3973931 B2 | 9/2007 |
| KR | 100913235 | 8/2009 |
| KR | 100913235 B1 | 8/2009 |
| WO | 2003023923 | 3/2003 |

OTHER PUBLICATIONS

Hestroffer, Karine, Supplementary Partial European Search Report for PCT/US2021022141, Jul. 18, 2023, 19 pages, European Patent Office, Munich, Germany.

English Translation of KR 100913235 B1 (published Aug. 24, 2009) with the corresponding Korean language text of KR 100913235 B1, all as provided with the PCT International Search Report & PCT Written Opinion of the International Searching Authority for PCT/US2021/022141 issued Jun. 29, 2021 by ISA/US, US, 8 pages.

Hestroffer, Karine, Supplementary European Search Report and European Search Opinion for PCT/US2021022141, Oct. 16, 2023, 18 pages, European Patent Office, Munich, Germany.

* cited by examiner

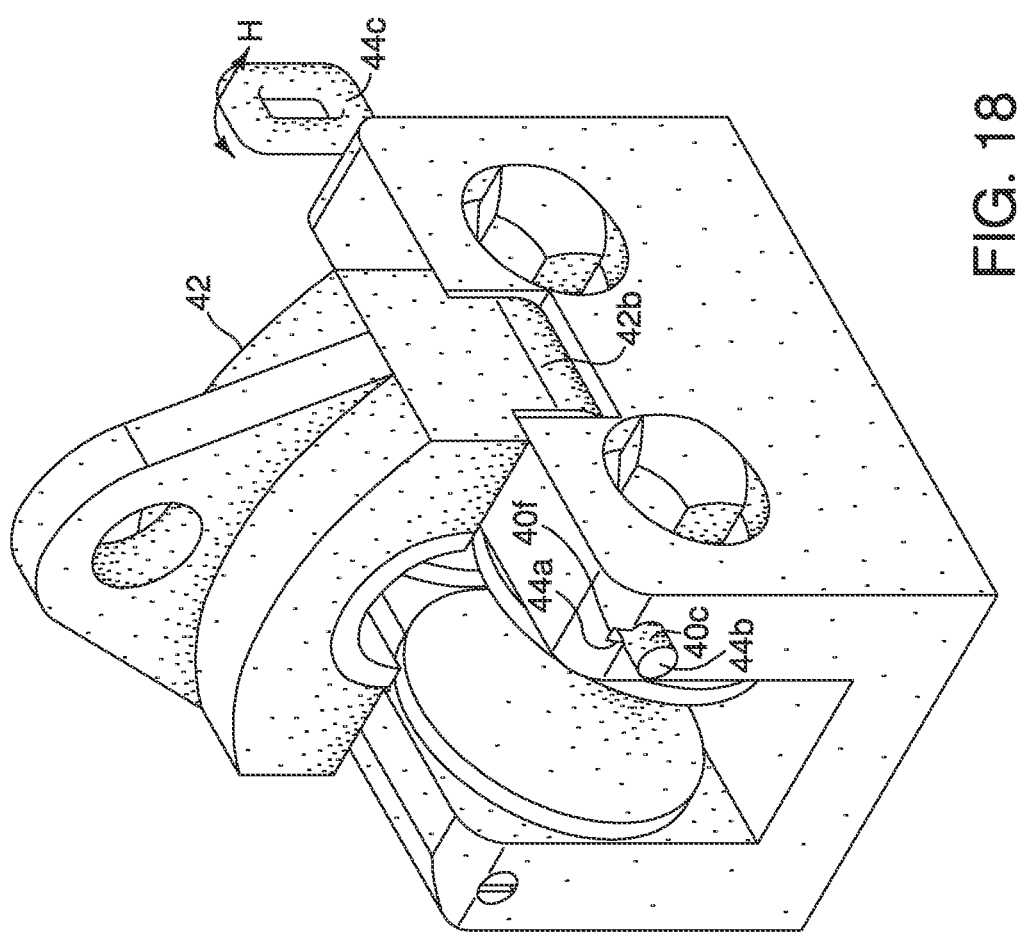

METHOD AND APPARATUS FOR LIFTING A BUNDLE OF SUB-CONDUCTORS

TECHNICAL FIELD

One aspect of the disclosure herein relates to the field of manipulators for lifting or otherwise manipulating sub-conductor bundles, and in particular to a method and apparatus for simultaneously lifting and translating each sub-conductor of a bundle of sub-conductors in a single phase bundle.

BACKGROUND

As described in U.S. Pat. No. 8,573,562, high voltage transmission and distribution lines are typically strung between a series of spaced-apart support structures or poles. The conductors are connected to insulators mounted on poles or suspended from cross arms extending at the upper end of transmission or distribution poles, or to conductor support points built into transmission structures. Periodically it is necessary to replace or repair the poles or structures, cross arms and insulators to maintain the electrical circuit in good working order. It is preferable if this maintenance and repair work, referred to as hot line work, can be performed without de-energizing the conductors in order to avoid, for example an interruption of service. Hot line work is a potentially hazardous undertaking. Safety regulations require that linemen maintain a minimum work clearance or "limit of approach distance" from energized conductors. The limit of approach distance varies depending upon the voltage of the conductors. The higher the voltage, the larger the limit of approach distance required.

As described in U.S. Pat. No. 7,535,132, alternating current is generated in a three-phase configuration. The three phases, A phase, B phase and C phase, are all transported over separate conductors, cables or wires. Each such separate single conductor may be referred to in the industry as a phase. It is appreciated by one skilled in the art, that in some systems, more than one conductor (referred to herein as sub-conductors) carries the power load for a particular phase. This may be done in instances when a load is greater than a single conductor can accommodate. In such cases multiple (bundled) sub-conductors are often located adjacent to one another and may hang from the same insulator as shown herein labelled as prior art, in FIGS. 1 and 2. The conductors may be separated by spacers. Insulators may, as illustrated, be configured to carry double sub-conductors, two sub-conductors per phase, under a yoke plate attached to the insulator.

A manipulator for manipulating multiple sub-conductors in a single phase bundle is described in U.S. Pat. No. 8,573,562. The manipulator supports the sub-conductors in an energized single phase bundle, and includes a rigid support member and first and second actuators mounted on the support member, wherein each actuator is independently actuable of the other. Insulators are mounted on each actuator. A selectively releasable coupler is mounted on each insulator for selectively releasable coupling of each insulator to a corresponding sub-conductor. The actuators extend corresponding insulators independently of one another from the support member to thereby separate from each other, by an optimized separation distance, the distal ends of each insulator.

Auxiliary cross arms for temporarily lifting and supporting energized conductors from below are well known. Such cross arms typically have adapters which are connectible to the boom jibs of boom or bucket trucks.

SUMMARY

A bundle lifter for lifting a sub-conductor bundle having a plurality of spaced-apart sub-conductors, includes a base platform adapted for rotational mounting onto a single point conductor lifter, four sub-conductor wire cages mounted on the platform to support a sub-conductor thereon, each wire cage adapted to releasably hold a single sub-conductor and to swivel relative to the platform, wherein when the wire cages are positioned under the sub-conductor bundle, the wire cages are swivelled to align their corresponding rollers with a corresponding sub-conductor for rolling support of the sub-conductor on the roller as the bundle lifter is elevated on the single point conductor lifter upwards from under the sub-conductor bundle to simultaneously pick each sub-conductor in the bundle into its wire cage for translation of the bundle from an original position to a new position spaced apart from the original position. In a preferred embodiment the platform is planar. In a one embodiment the platform is mounted on a plate which is adapted to be mounted on the single point conductor lifter, wherein the plate and the platform are adapted to swivel relative to one another.

The bundle lifter for lifting the bundle of three sub-conductors may also be described as including the platform wherein the platform has a perimeter and the four wire cages are mounted spaced around the perimeter, and wherein the four wire cages are substantially equally spaced around the perimeter and are, in sequential order around the perimeter edge, first, second, third, and fourth wire cages. The first and third wire cages are mounted on posts so as to elevate the first and third wire cages a substantially equal first distance above the platform. The second and fourth wire cages are mounted a substantially equal second distance from the platform wherein the first distance is greater than the second distance. When the bundle lifter is in a first platform orientation for picking a three sub-conductor bundle having a two high one low configuration, the platform is rotated relative to the single point conductor lifter so that the first and third wire cages are aligned to engage the two high sub-conductors and the second and fourth wire cages aligned to engage the low sub-conductor. When the bundle lifter is in a second platform orientation, rotated substantially 90 degrees from the first platform orientation in the plane containing the platform, for picking a three sub-conductor bundle having a one high two low configuration, the first and third wire cages are aligned to engage the one high sub-conductor and the second and fourth wire cages are aligned to engage the two low sub-conductors. The first and third wire cages may each be rotationally mounted on a post extending orthogonally from the platform, each post having a length equal to the first distance. The second and fourth wire cages may be mounted on the surface of the platform or mounted on a bracket mounted on the surface of the platform.

The lifter for a bundle of four sub-conductors includes the base platform on which is mounted an upstanding central post. A conductor wire cage support arm is rotatably mounted on the top of the central post for rotation of the arm about the top of the central post in a plane parallel to the base platform. The conductor wire cage support arm is elongate and is rotatable relative to the central post about an axis of rotation which is orthogonal to a plane containing the platform. A first pair of conductor wire cages are mounted on opposite ends of the support arm. A second pair of conductor wire cages are mounted on the platform so as to be at a lower elevation than the conductor wire cages on the support arm, and at opposite sides of the platform. The central post is located between the second pair of conductor wire cages, for example centrally located. The conductor wire cages in the second pair of conductor wire cages may each be mounted directly down onto the platform or onto a low-rise mounting bracket on the platform.

The lifter for supporting a bundle of four sub-conductors also includes the platform, and wherein the platform has a perimeter, and wherein a first and third wire cage of the four wire cages are mounted on the platform proximate the perimeter and oppositely disposed to each other across the platform.

A post is mounted on, so as to extend from, the platform. An elongate arm is mounted so as to swivel on a distal end of the post so that the arm rotates in a plane parallel to the plane containing the platform. A second and fourth wire cage of the four wire cages are mounted to opposite ends of the elongate arm, and the post is mounted between the first and third wire cages, so as to position the second and fourth wire cages above the first and third wire cages. When the elongate arm is rotated so as to align a longitudinal axis of the elongate arm between the first and third wire cages, the elongate arm is elevatable between a lower pair of a four sub-conductor bundle. When the arm is rotated so as to position the longitudinal axis of the arm parallel to an axis extending to and between the first and third wire cages, such that the first and third wire cages are aligned to engage the lower pair of sub-conductors, the second and fourth wire cages are aligned to engage an upper pair of sub-conductors of the four sub-conductor bundle. The first and third wire cages may each be mounted on a post extending orthogonally from the platform, each post rotationally mounted to the platform and having a length equal to the first distance. The second and fourth wire cages may be mounted on the surface of the platform, or mounted on a bracket mounted on the surface of the platform.

Each wire cage includes at least one roller to support a conductor thereon, and in some embodiments the at least one roller is a pair of rollers mounted within the wire cage, both rollers aligned to support their corresponding conductor.

The present disclosure also describes a system using the above described bundle lifters and a boom adaptor, wherein the boom adaptor is configured for mounting onto a distal end of a boom, and wherein the single point conductor lifter includes at least one tier of parallel elongate insulators mounted on the boom adaptor so as to extend away from the boom adaptor. In embodiments described herein the at least one tier of parallel elongate insulators may include stacked first and second tiers of parallel elongate insulators, wherein the first tier includes a first set of elongate insulators which are mounted to the boom adaptor between the boom adaptor and the second tier of insulators mounted under the platform. The number of insulators in the first tier may be greater than a number of insulators in the second tier, and each tier of insulators may be arranged in a matrix. For example, each tier may have a matrix of two rows and two columns of insulators. Or for example, the first tier could be a matrix two rows and three columns and the matrix of the second tier of insulators may be two rows and two columns.

BRIEF DESCRIPTION OF THE DRAWINGS

FIG. 18 is a perspective view of the conductor wire cage of FIG. 15, showing the wire cage gate in a closed position with the pin in the closed position securing the wire cage gate.

DETAILED DESCRIPTION

Figures 1, 2:
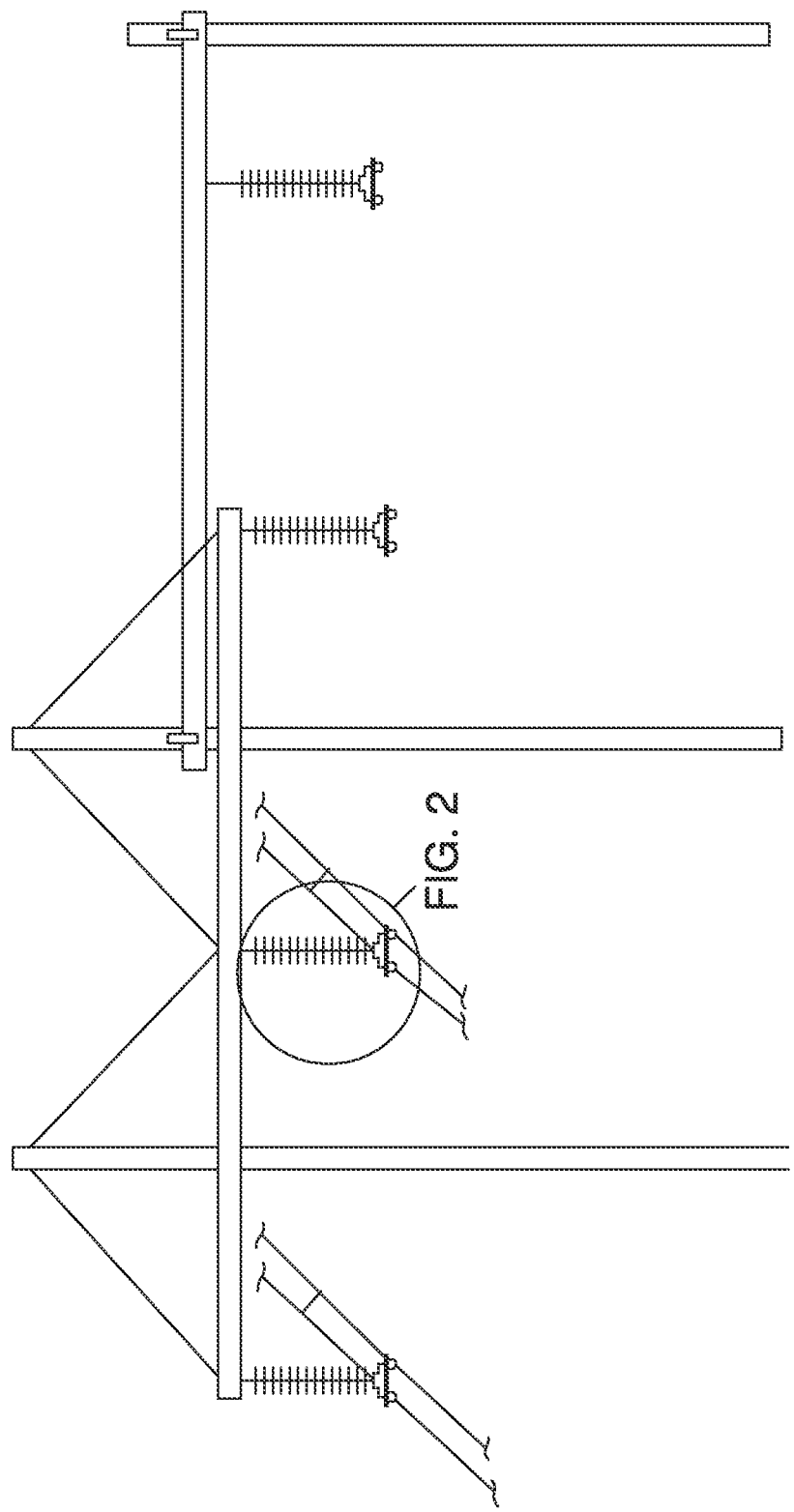
FIG. 1 is a depiction of prior art support for a two sub-conductor bundle.
FIG. 2 is a depiction, in an enlarged view, of the two bundle support of FIG. 1.
Figure 2:
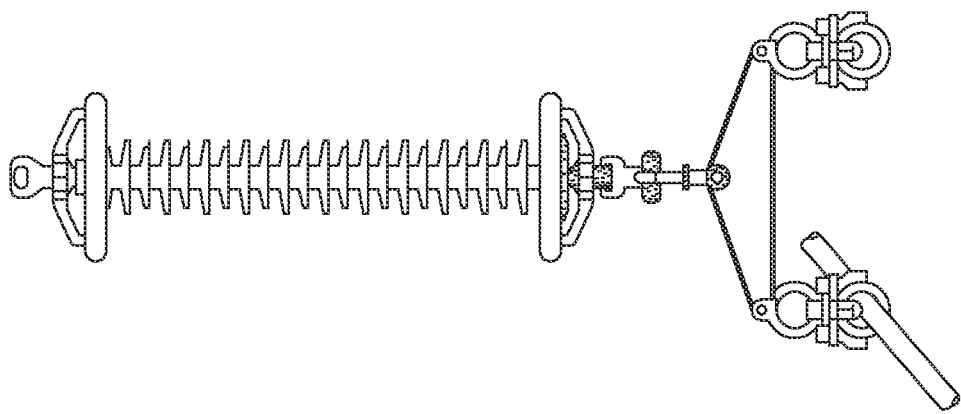

Sub-conductors in a bundle typically have 18 inch spacing between the sub-conductors. FIGS. 1 and 2 show a prior art, two sub-conductor bundle in a horizontal side-by-side configuration and a horizontal side by side configuration offset vertically. Each sub-conductor may be picked, for example by using a single tier, single point lifter.

Figure 3:
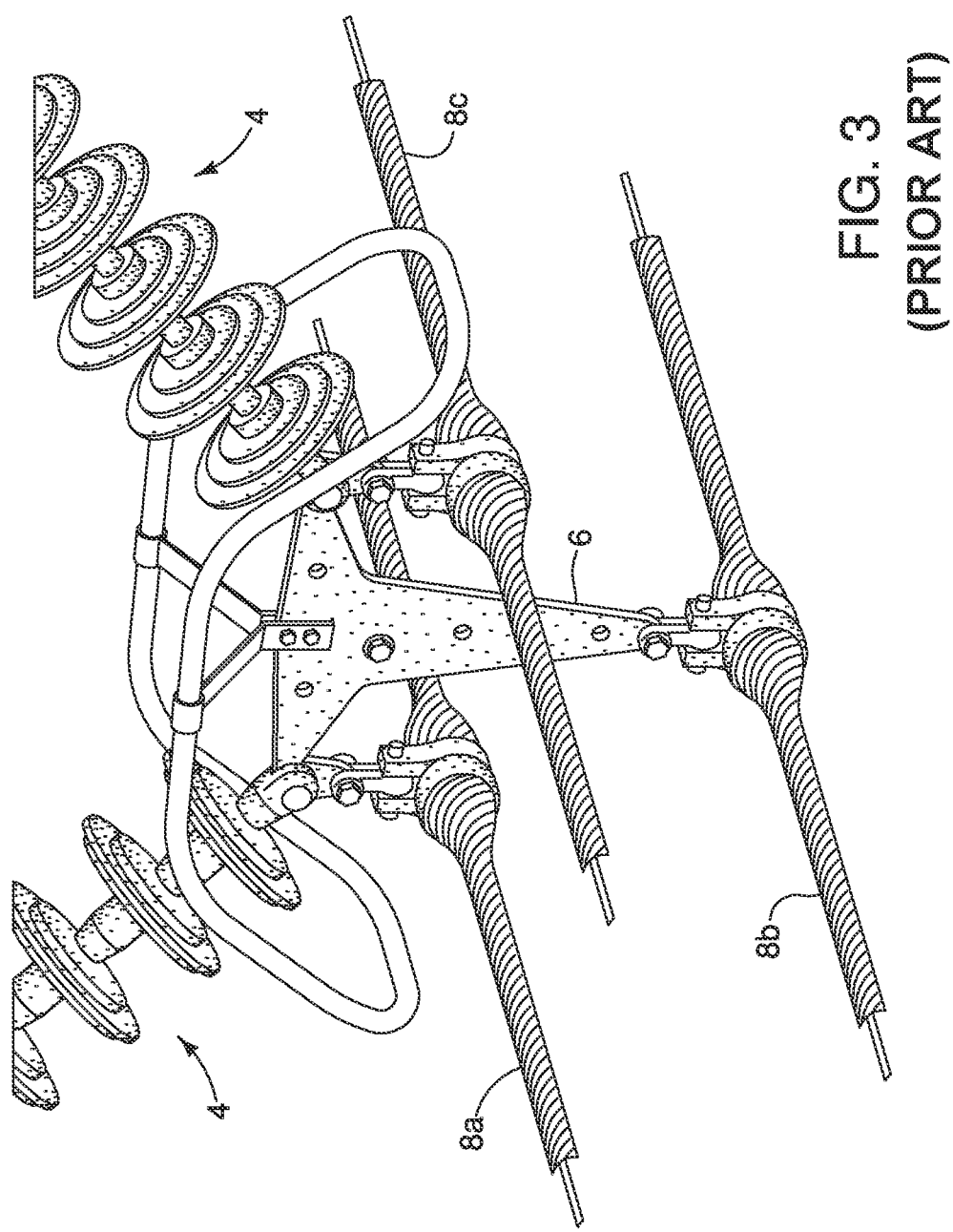
FIG. 3 is a close-up perspective view of a prior art three sub-conductor bundle, the three sub-conductor bundle supported on a V-string pair of insulators and a T-shaped yoke plate.
Figure 4:
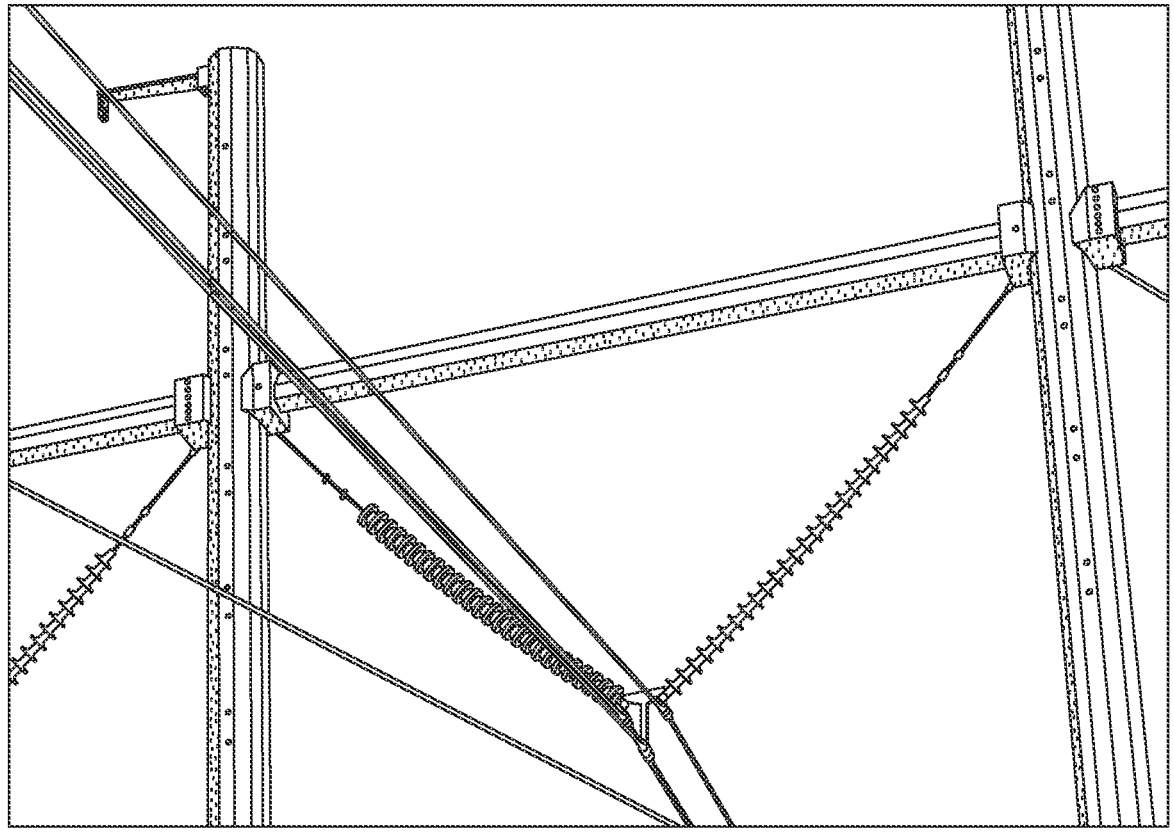
FIG. 4 is a perspective view of the three sub-conductor bundle shown in FIG. 3, the three sub-conductor bundle on a support structure.

FIGS. 3 and 4 show a conventional three sub-conductor bundle configuration where the three sub-conductors are held spaced apart by a T-shaped yoke plate 6. The T-shaped yoke plate holds the sub-conductors in a two up, one down arrangement evenly spaced 18 inches apart in a delta configuration. With a different yoke plate, or for example by inverting the T-shaped yoke plate 6, the sub-conductors could also be supported in a one up, two down arrangement. The yoke plate is suspended from a support structure by a V-string pair of insulators 4.

Figure 5:
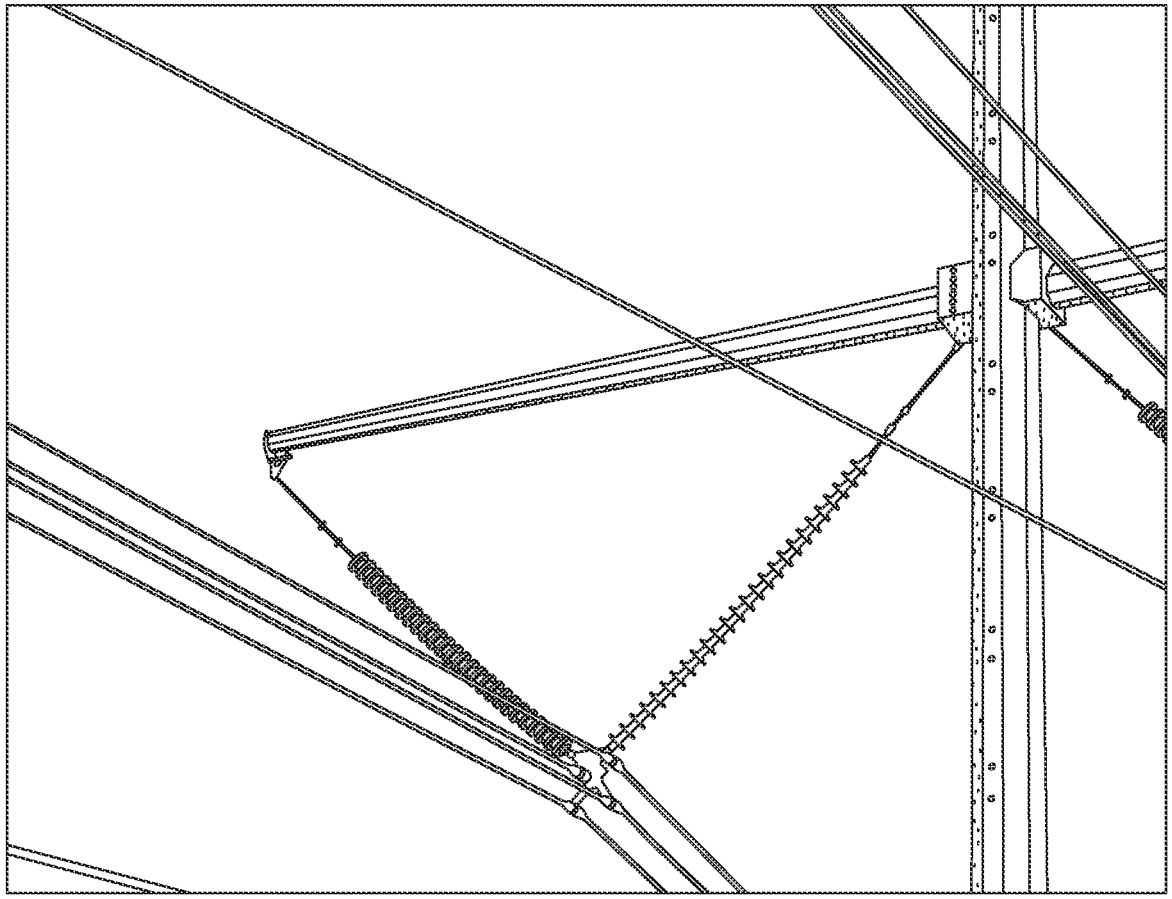
FIG. 5 is a perspective view of a four sub-conductor bundle known in the art, the four sub-conductor bundle supported on a V-string pair of insulators and an X-shaped yoke plate.

FIG. 5 shows a conventional four sub-conductor bundle configuration held in an X-shaped yoke plate. The upper two sub-conductors are directly above the corresponding lower two sub-conductors in the bundle and generally spaced 18 inches apart horizontally and vertically.

When it is required to, for example, change the insulators supporting the conductor bundle from the support structure, the problem is how to simultaneously lift all of the sub-conductors of the two, three or four sub-conductors bundle of the energized phase, and then move the conductor bundle away from the support structure 2 so as to provide the required limit of approach distance for a lineman to safely change the insulators. Of the difficulties posed by this, at least three are notable: 1) the sub-conductors are energized and can be of high voltage, so insulators of the required voltage rating are needed to provide the electrical insulation, the higher the voltage the longer the insulators have to be; 2) the bundle of sub-conductors usually is heavy, so the insulators on the single point lifter need to support the heavy load; for example, they may need to be rated to support 25,000 lbs both in compression, when the insulators are entirely vertical, and at least some of that weight load in bending, for example 1,000 lbs laterally when the insulators are off-vertical; and, 3) for a three bundle configuration, the bundle may be configured as either two up, one down, or one up, two down, so that the three bundle wire holder, such as provided herein, should be able to convert between these two possible configurations. For a four bundle configuration, the four bundle wire holder, such as provided herein, must be able to pass the conductor wire cages for the upper two sub-conductors between the lower two sub-conductors and then re-configure so that the upper and lower sub-conductors are supported, secured and lifted simultaneously.

The three and four sub-conductor bundle wire holders will now be described separately.

Three Sub-conductor Bundle Wire Holder

Figure 6:
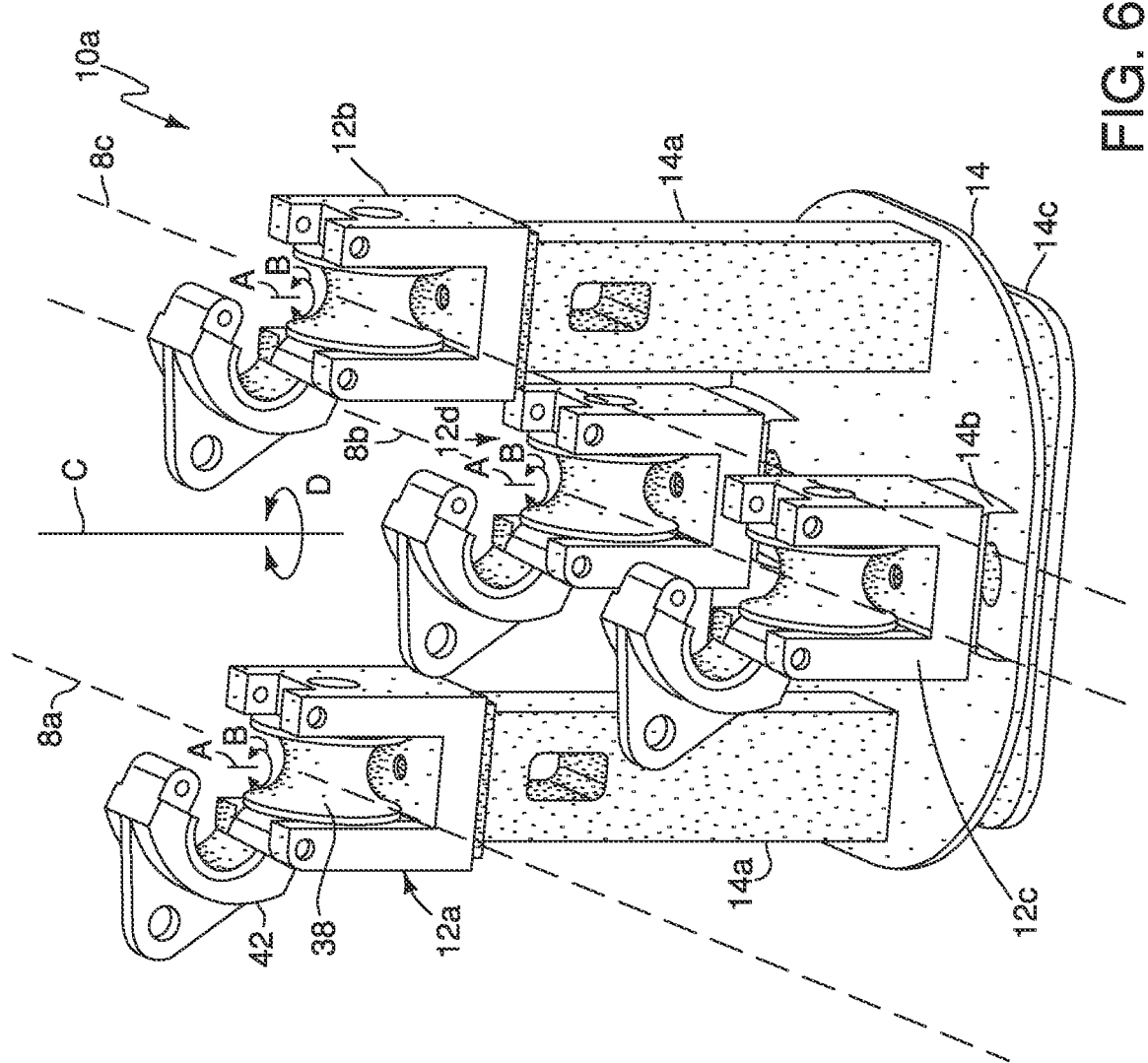
FIG. 6 is a perspective view of a three sub-conductor bundle lifter with two sub-conductors up and one sub-conductor down in accordance with the present disclosure.
Figure 7:
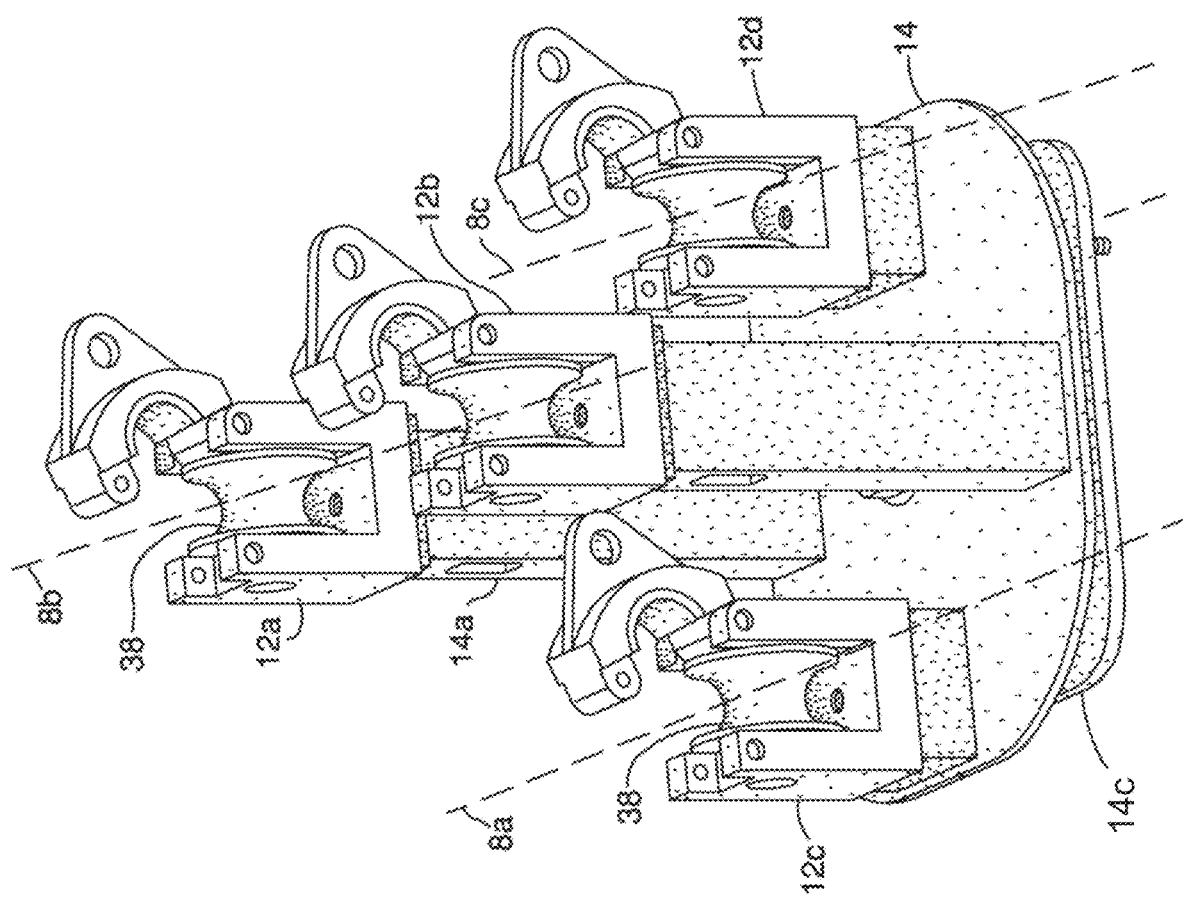
FIG. 7 is a further perspective view of the three sub-conductor bundle lifter of FIG. 6, the bundle lifter is rotated 90 degrees and the wire cages are rotated 90 degrees to accommodate one sub-conductor up and two sub-conductors down.
Figure 8:
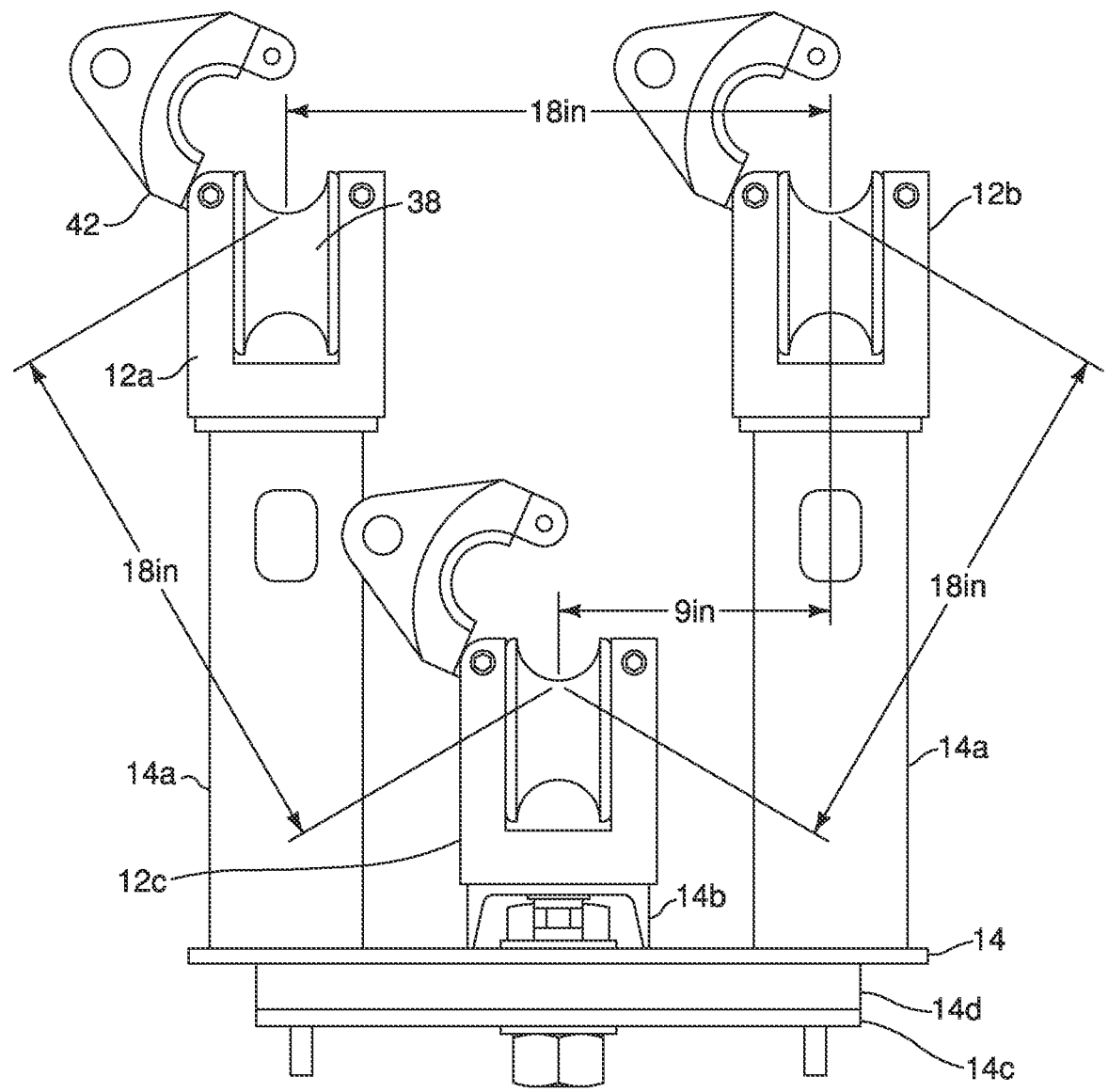
FIG. 8 is a front perspective view of the three sub-conductor bundle lifter of FIG. 6 showing the sub-conductors equally spaced in standard separation of 18 inches in a delta configuration.

As seen in FIGS. 6 to 8, commencing with the perspective view of FIG. 6, the three sub-conductor bundle wire holder 10a is shown configured to hold two sub-conductors up (or high), and one sub-conductor down (or low). Each conductor wire cage (12a-12d), where herein, the terms "conductor holder cage" and "wire cage" are used interchangeably, is mounted so that it may be rotated or swivelled about its corresponding axis of rotation A in either direction. The wire cages may be prior art single roller wire cages, or may be double roller wire cages such as described below where appropriate, for example for use under very heavy loading. The direction of rotation is shown by arrow B. Wire cages 12a, 12b are mounted on the upper end of equal height elongate posts 14a, extending upwardly from platform 14. Wire cages 12c, 12d are mounted on platform 14 on low-rise mounting brackets 14b. Axes of rotation A are orthogonal to the plane containing platform 14.

The four wire cages 12a, 12b, 12c, 12d are mounted equally spaced around the perimeter of platform 14. Platform 14 may be circular, and may be rotated or swivelled about axis of rotation C, in direction D. Platform 14 may for example be mounted on a bearing plate 14d on a swivel plate 14c. By swivelling platform 14 by 90 degrees about axis C, the wire cage 10a may be converted from the two up, one down configuration of FIG. 6 to the two down, one up configuration of FIG. 7. The configuration may be reversed by reversing the rotation about axis C, or by rotating about axis C in the same direction by a further 90 degrees. Once platform 14 is rotated about axis C to enable supporting and lifting of the desired sub-conductor configuration, the wire cages 12a, 12b, 12c, and 12d are rotated about axis A to align their rollers 38 to run along their corresponding sub-conductor 8a, 8b or 8c (shown in dotted outline in FIGS. 6 and 7). Three sub-conductor bundle wire holder 10a is seen in front elevation in FIG. 8, showing, without intending to be limiting, relative spacing dimensions, by way of example, for sub-conductors having nominal 18 inch spacing.

Four Sub-conductor Bundle Wire Holder

As seen in FIGS. 9 to 12, a bundle wire holder for a bundle of four sub-conductors 10b includes a base platform 14 on which is mounted a centrally located upstanding central post 16. A conductor wire cage support arm 18 is rotatably mounted on the top of the central post 16 for rotation of the arm 18 in a plane of rotation which is parallel to a plane containing platform 14. The plane of rotation of arm 18 substantially intersects the top of the central post 16. Arm 18 is elongate and rotatable relative to central post 16 about an axis of rotation E which is orthogonal to the plane containing platform 14. In one embodiment, not intended to be limiting, platform 14 may be a circular plate.

Figure 11:
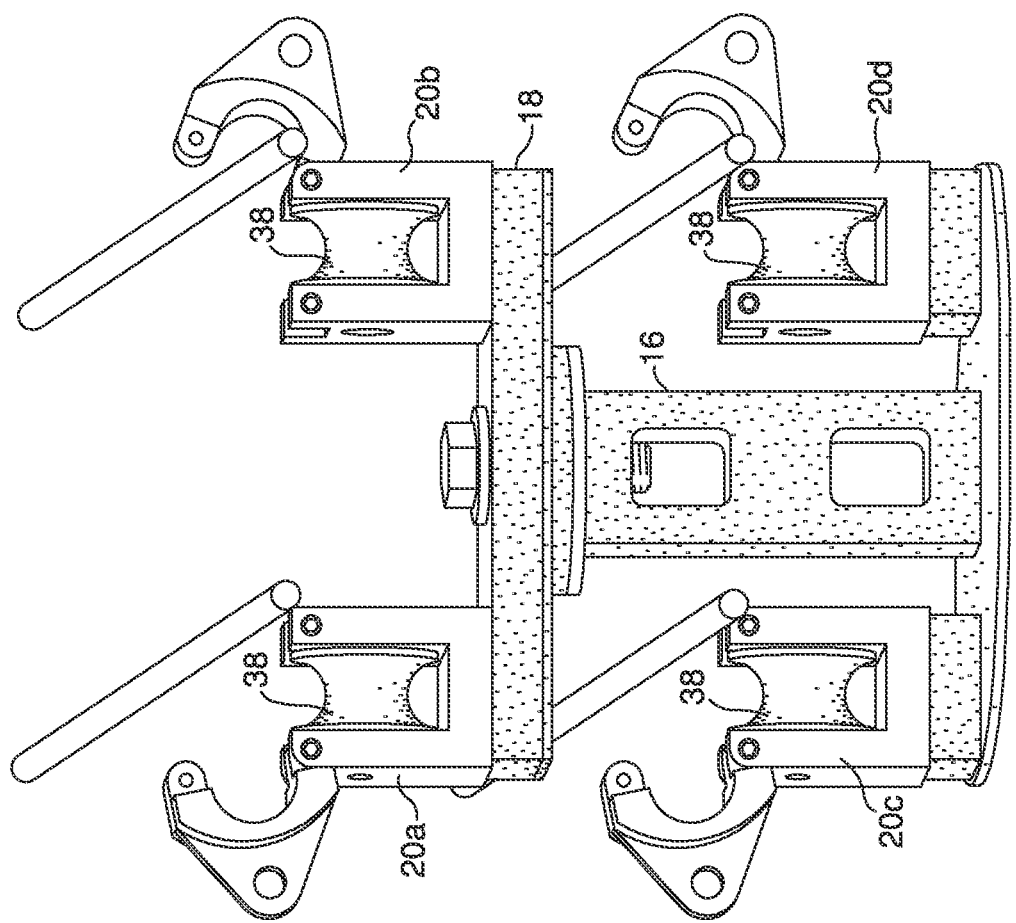
FIG. 11 is a front perspective view of the four sub-conductor bundle lifter of FIG. 9, shown with upper wire cages rotated 90 degrees into a position configured to pick the four sub-conductors simultaneously.
Figure 12:
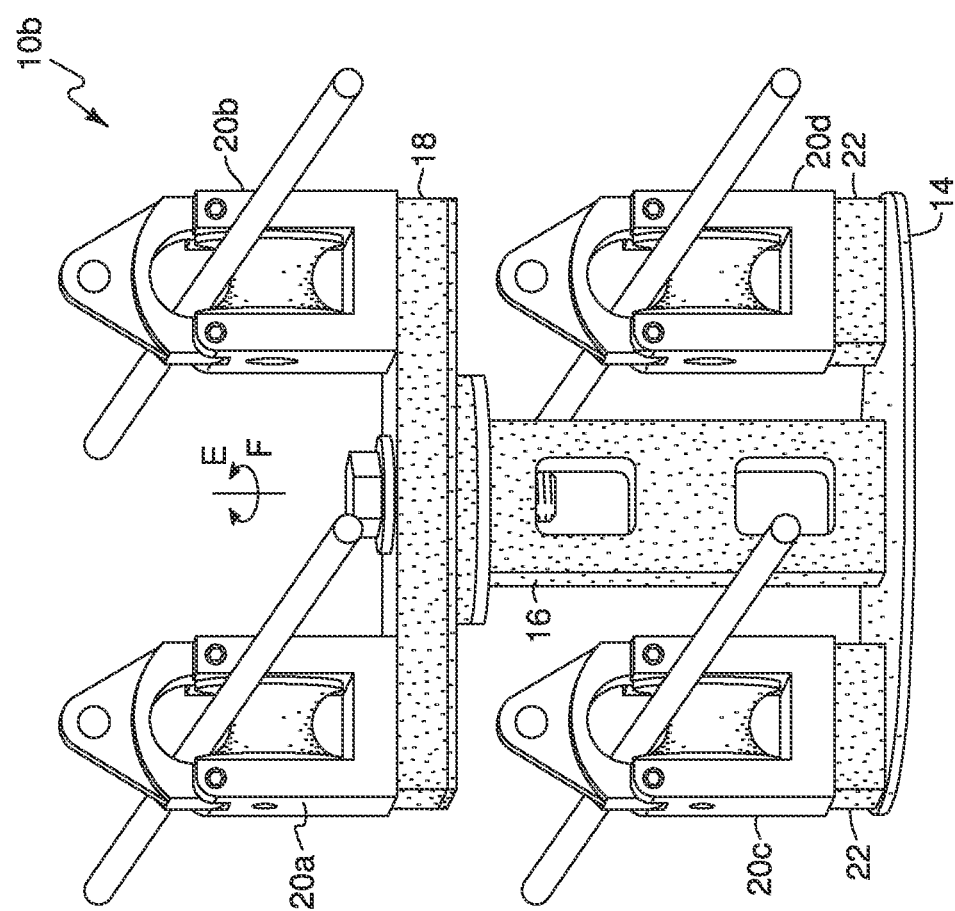
FIG. 12 is a front perspective view of the four sub-conductor bundle lifter of FIG. 9, shown as supporting the four sub-conductors in the four wire cages of the lifter.

As best seen in FIGS. 11 and 12, a first pair of conductor wire cages 20a, 20b is mounted on opposite ends of the support arm 18. A second pair of conductor wire cages 20c, 20d is mounted, by way of mounting brackets 22, onto platform 14. Conductor wire cages 20c, 20d are mounted below the elevation of support arm 18 on central post 16 so that rotation of support arm 18 about axis of rotation E does not interfere with wire cages 20c, 20d. Mounting brackets 22, and corresponding wire cages 20c, 20d are mounted on opposite sides of platform 14, oppositely disposed on opposite sides of central post 16. Thus the central post 16 is located centrally between the conductor wire cages 20c, 20d. In an alternative embodiment, not intended to be limiting, conductor wire cages 20c, 20d may be mounted directly onto platform 14. Whether or not conductor wire cages 20c, 20d are mounted onto platform 14 using mounting bracket 22, conductor wire cages 20c, 20d are mounted, for example on a swivel mount such as would be known to one skilled in the art, so that the wire cages 20c, 20d may be rotated relative to platform 14. Likewise, conductor wire cages 20a, 20b are rotatably mounted on support arm 18, for example by means of known swivel mounts, so as to be rotatable relative to support arm 18.

Figure 9:
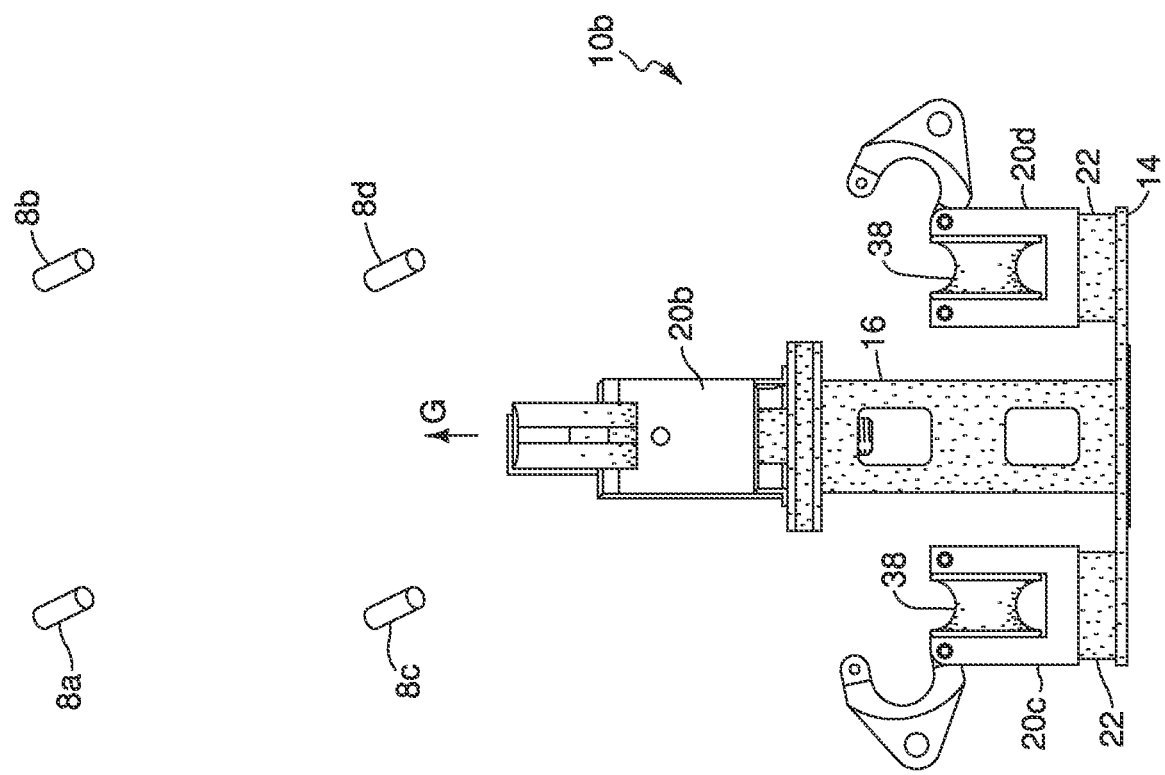
FIG. 9 is a front perspective view of a four sub-conductor bundle lifter in accordance with the present disclosure, the lifter is configured in a position to manoeuvre between the lower pair of sub-conductors in order to get into position to lift the four sub-conductor bundle.
Figure 10:
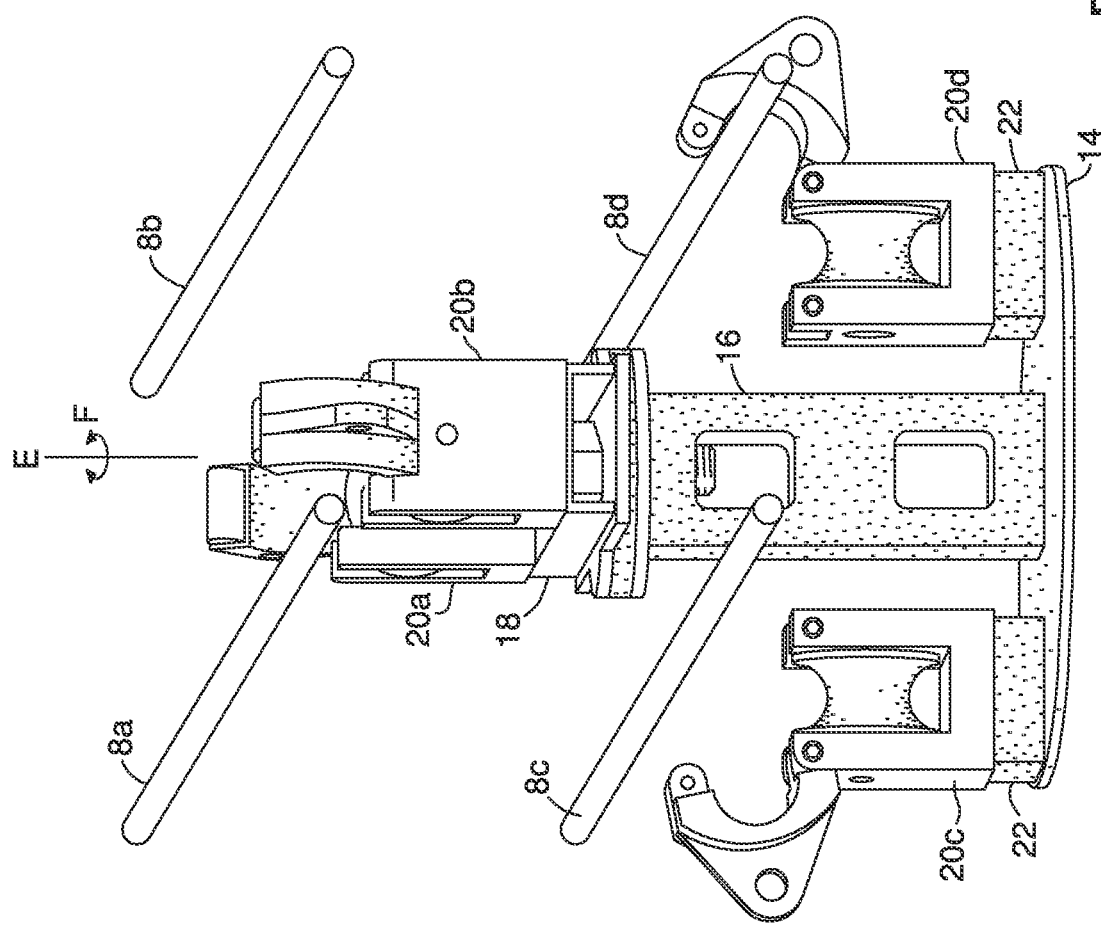
FIG. 10 is a front perspective view of the four sub-conductor bundle lifter of FIG. 9, shown in a position prior to configuring the lifter to pick the four sub-conductors simultaneously.

In order to capture sub-conductors 8a, 8b, 8c, and 8d the sub-conductor bundle wire holder 10b is moved vertically upwardly in direction G (show on FIG. 11) from underneath the sub-conductor bundle. Because the four sub-conductors are to be picked simultaneously, wire cages 20a and 20b must be moved upwardly between the lower two sub-conductors 8c and 8d without interfering with those sub-conductors, and then positioned underneath the upper two sub-conductors 8a and 8b. To accomplish this, support arm 18 carrying the wire cages 20a and 20b is rotated from the pick position of FIG. 11 to the insertion position of FIGS. 9 and 10 by rotating support arm 18 about axis E by substantially 90 degrees. This orients the arm 18 and wire cages 20a and 20b such that they may be inserted vertically upwards between the lower two sub-conductors 8c and 8d, as shown in FIGS. 9 and 10. Once wire cages 20a and 20b on support arm 18 are inserted between, so as to be positioned above, sub-conductors 8c and 8d, a further 90 degree rotation of support arm 18 swings cages 20a and 20b from their insertion position into their pick position, as shown in FIG. 11. Once in the pick position, and with the conductor cages open so as to be ready to receive the sub-conductors 8a and 8b onto their corresponding rollers, the assembly 10b is then elevated into the position illustrated in FIG. 12 and the wire cages closed so as to capture the four sub-conductors 8a to 8d within their corresponding conductor cages 20a to 20d. With the sub-conductors thus secured and picked, the four bundle wire holder assembly may be supported and moved so as to manipulate the sub-conductor bundle to provide a safe working clearance for a lineman.

Figure 13:
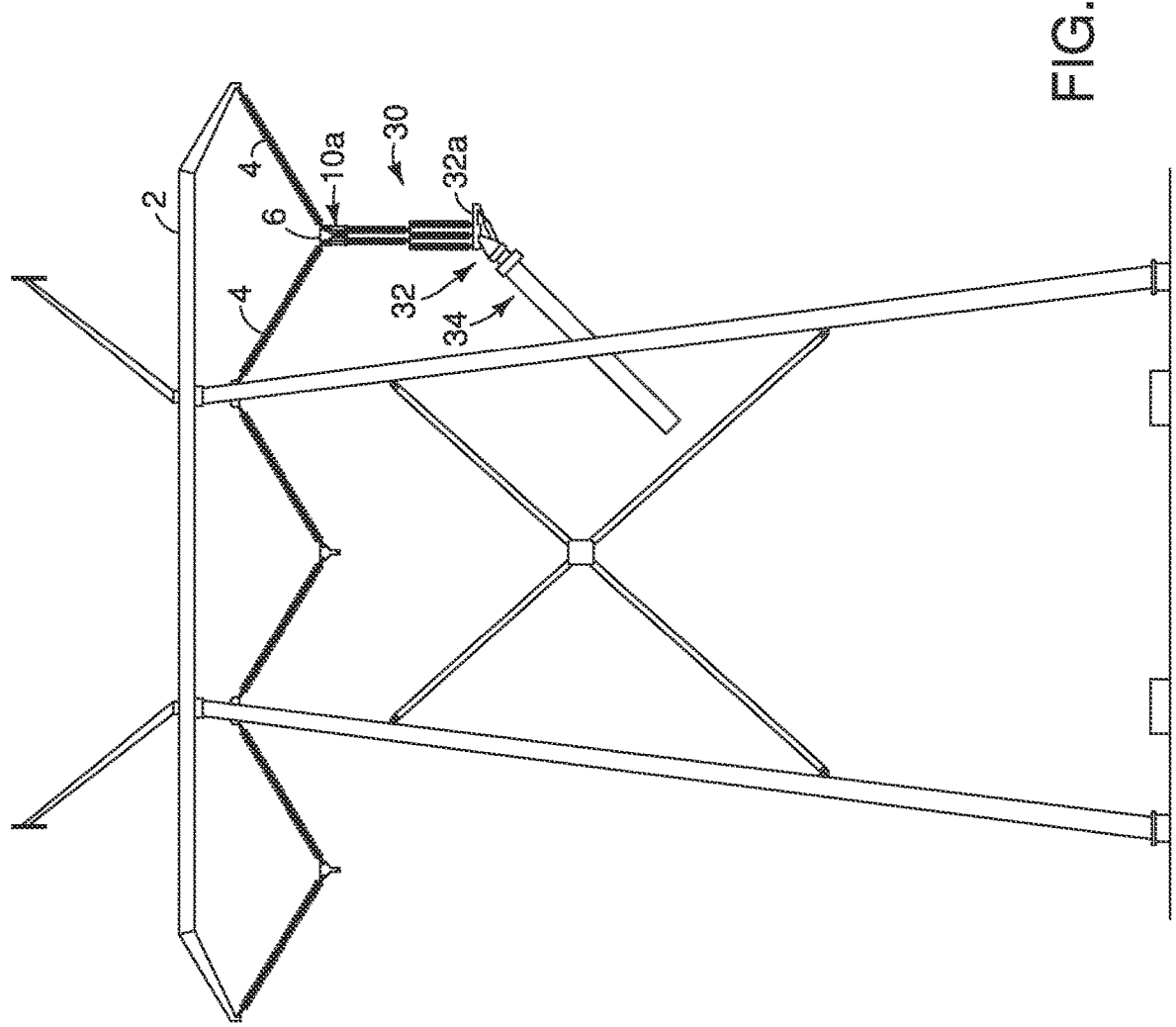
FIG. 13 is a front perspective view of a 500 kV H-frame support structure supporting a three sub-conductor bundle in a two up, one down configuration and a portion of a boom supporting an embodiment of a three sub-conductor bundle lifter in accordance with the present disclosure.
Figure 14:
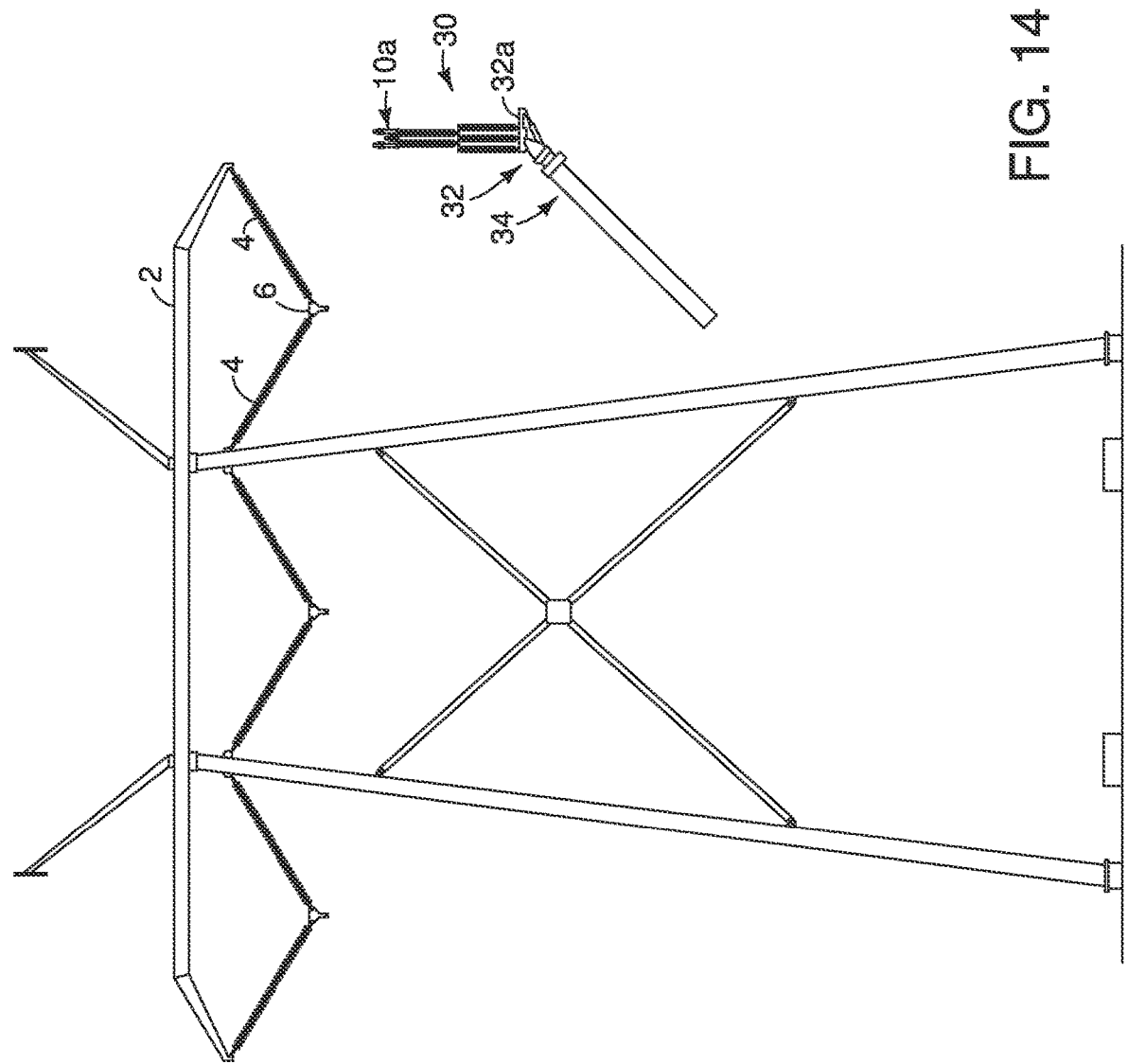
FIG. 14 is a front perspective view of the H-frame support structure, single point lifter and three sub-conductor bundle lifter of FIG. 6, showing the three sub-conductor bundle supported in the bundle lifter and moved to a position apart from the original position of the bundle.

As seen in FIGS. 13 and 14, a sub-conductor bundle holder, such as the three bundle sub-conductor holder of FIGS. 6 and 7 or the four bundle sub-conductor holder of FIGS. 9 to 12, may be mounted as an accessory onto the distal end of an insulator stack 30. Although a three bundle sub-conductor holder 10a is illustrated by way of example, it is understood that a four bundle sub-conductor holder 10b, may also be used. It can also be noted that either the three bundle or four bundle wire holder may be used to pick only a horizontal two conductor bundle arrangement in any two wire cages in horizontal configuration. That is for example on a three or four bundle wire holder, either the two wire cages in up position or the two wire cages in the lower position may be used to pick a horizontal two conductor bundle. Thus in the example of FIGS. 13 and 14, a single point lifter with insulator stack 30 mounted onto the boom adaptor 32, and with boom adaptor 32 mounted onto crane or truck boom 34, and in particular with the lower end of insulator stack 30 mounted onto the selectively inclinable platform 32a of boom adaptor 32, insulator stack 30 is oriented vertically and, once in position underneath sub-conductor yoke plate 6 is moved upwardly so as to pick the sub-conductors using, in this example, three bundle sub-conductor wire holder 10a. Once the sub-conductors have been secured within conductor cages 12a, 12b, 12c, and 12d, boom 34 is lowered so as to free the sub-conductors from yoke plate 6 and then translated, in the illustrated example laterally, as shown in FIG. 14, away from the intended worksite so as to provide the required working clearance for a lineman to, for example, replace the insulators 4 on support tower 2.

Double Roller Wire Cage

Figure 15:
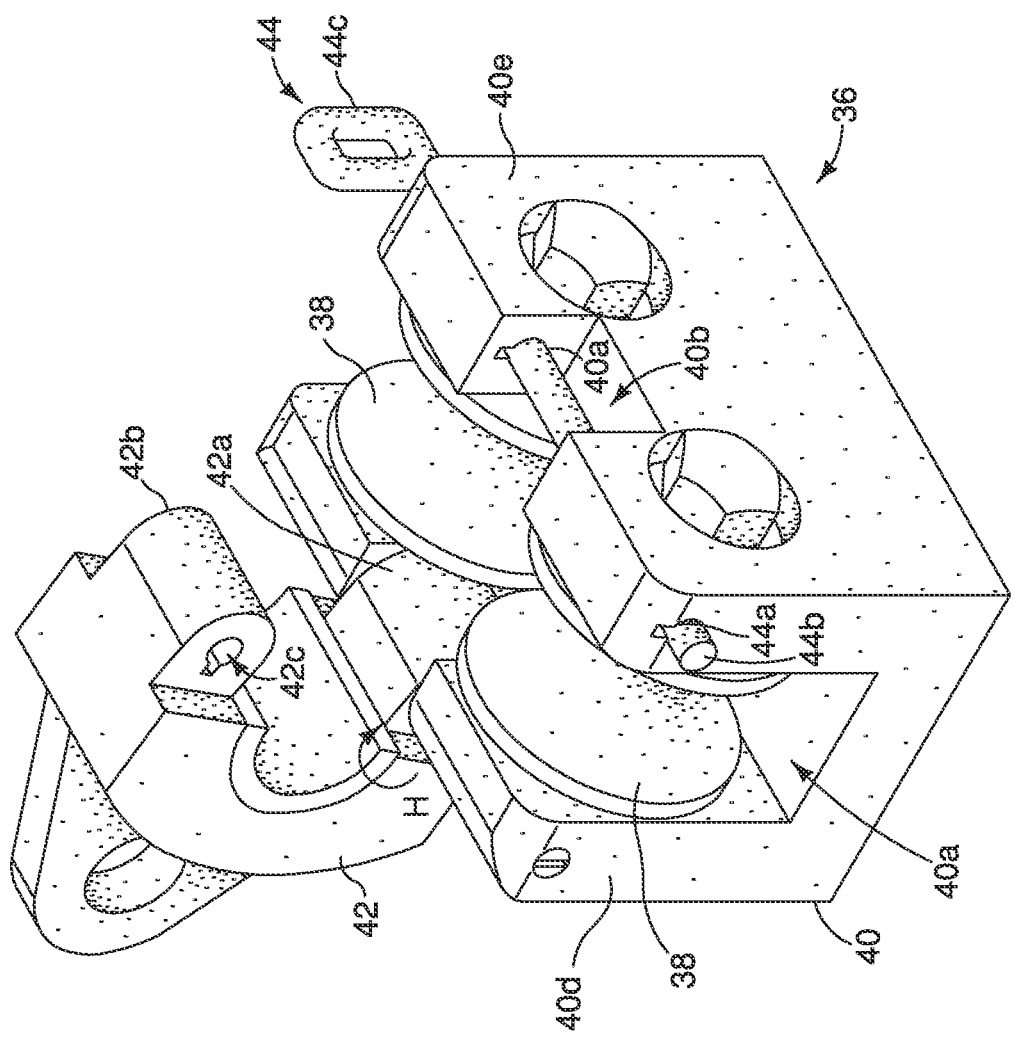
FIG. 15 is a perspective view of a conductor wire cage in accordance with the present disclosure, the wire cage including two rollers and the wire cage gate configured in an open position.

Conductor holders (interchangeably referred to herein as "wire cages" or "cages") 20a-20d, illustrated in FIGS. 9-12 and conductor holders 12a-12d illustrated in FIGS. 6 and 7, show the use of a single roller 38 within each cage. When the conductors are heavy, it is advantageous to distribute the load over two rollers instead of a single roller per wire cage, so as to reduce by half the downward pressure applied to each roller by the heavy conductor at each point of support where the conductor is supported by the roller. This for example reduces or eliminates deformation or damage of the aluminium strands of the conductor that may otherwise occur. Thus as seen in FIG. 15, an improved conductor wire cage 36 is provided having two adjacent rollers 38 mounted in line with one another and within the channel 40a of channel block 40. A wire cage gate 42 is mounted to one wall 40d of channel block 40 by means of a hinge 42a so that the gate 42 may be selectively rotated in direction H about hinge 42a so as to engage the locking tab 42b of gate 42 within notch 40b in the opposite wall 40e of channel block 40.

Figure 15A:
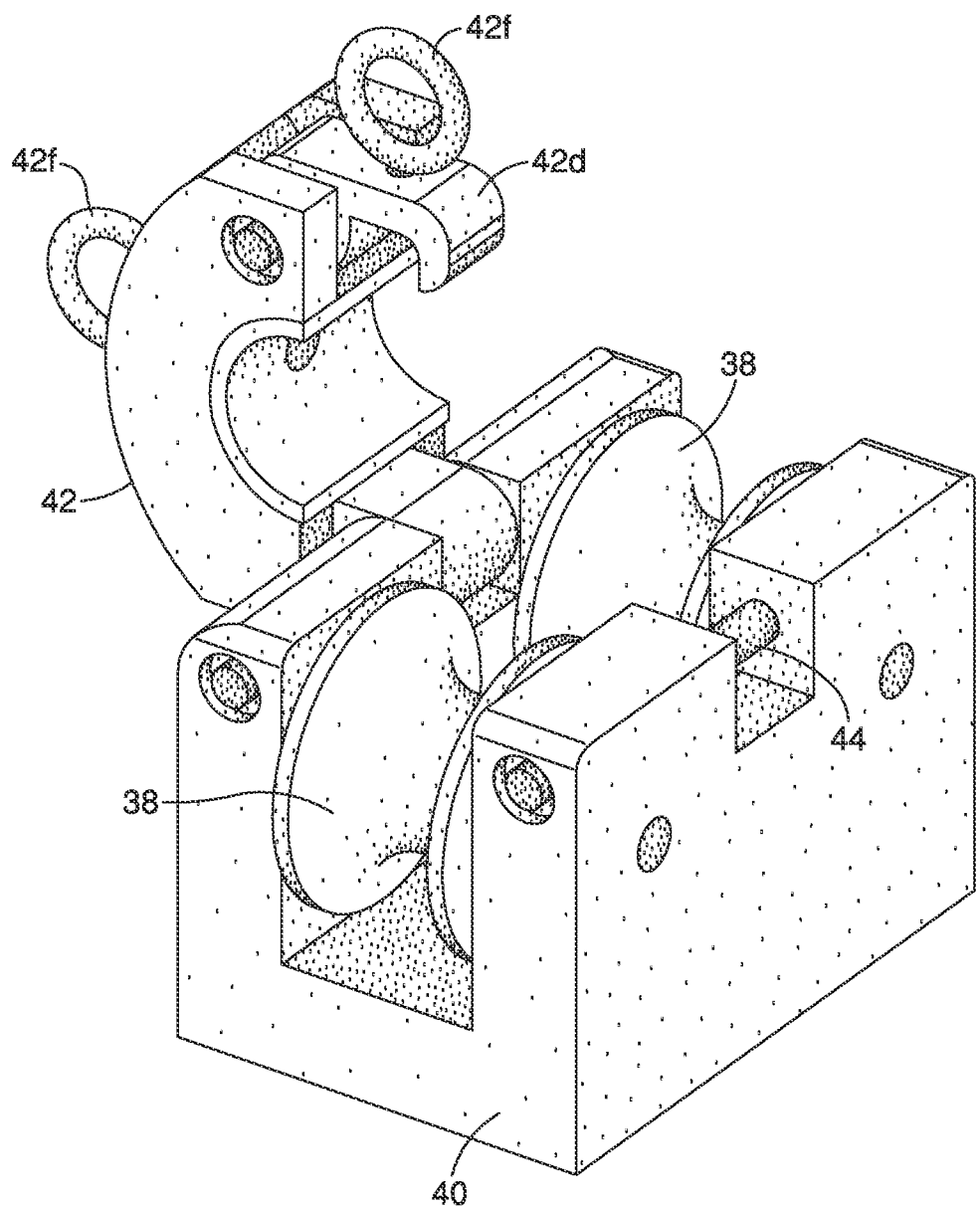
FIG. 15A is a perspective view of a conductor wire cage with a spring loaded latch in accordance with the present disclosure, the wire cage including two rollers and the wire cage gate in an open position.
Figure 15B:
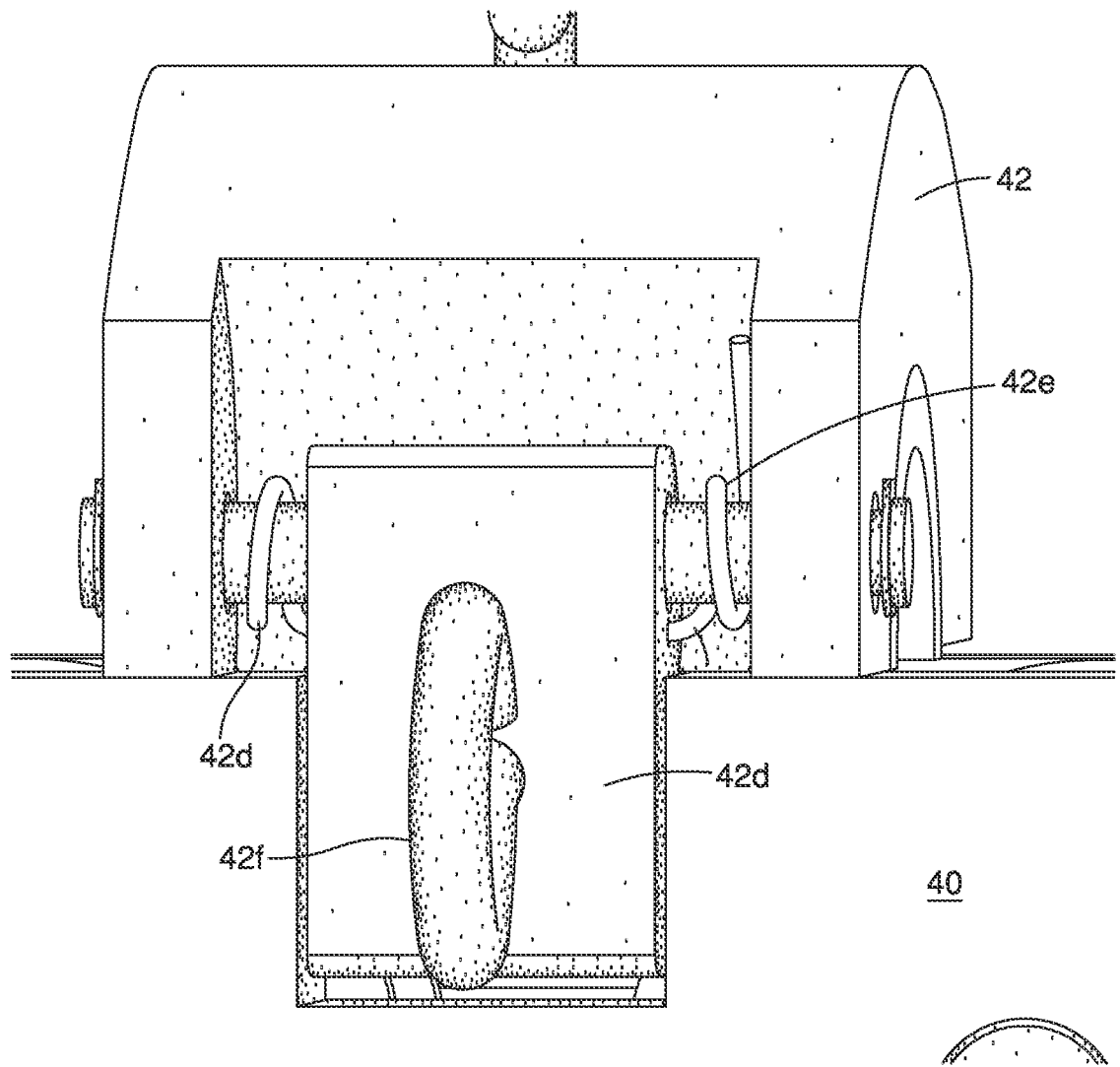
FIG. 15B is a view showing the two torsion springs that keep the wire cage latch in the closed position.

As seen in FIG. 15A, wire cage gate 42 may include a spring loaded latch 42d, shown in an open position. In FIG. 15B the latch 42d is shown in its closed position. A pair of helical coil springs 42e, which resiliently urge the latch 42c into its closed position, are mounted on pin 44 on either side of the latch 42d in FIG. 15B. Eyes 42f may be mounted on gate 42 and on latch 42d to provide for lineman to grasp and manipulate the gate or latch using for example a hotstick (not shown).

In the illustrated embodiment of FIG. 15, which is not intended to be limiting, locking tab 42b is releasably retained within notch 40b by means of a movable pin 44 which is slidably mounted in bores 40c in the notched wall 40e, so that pin 44 may be selectively removed from bores 40c and notch 40b to thereby allow locking tab 42b to be inserted into the notch so as to close the wire cage, or removed from the notch so as to open the wire cage. Locking tab 42b has a corresponding bore there through 42c, which aligns with bores 40c when the locking tab is seated within notch 40b. With notch 40b receiving locking tab 42b, pin 44 is slid through the aligned bores 40c and 42c so as to retain gate 42 in its locked position over rollers 38.

Figure 16:
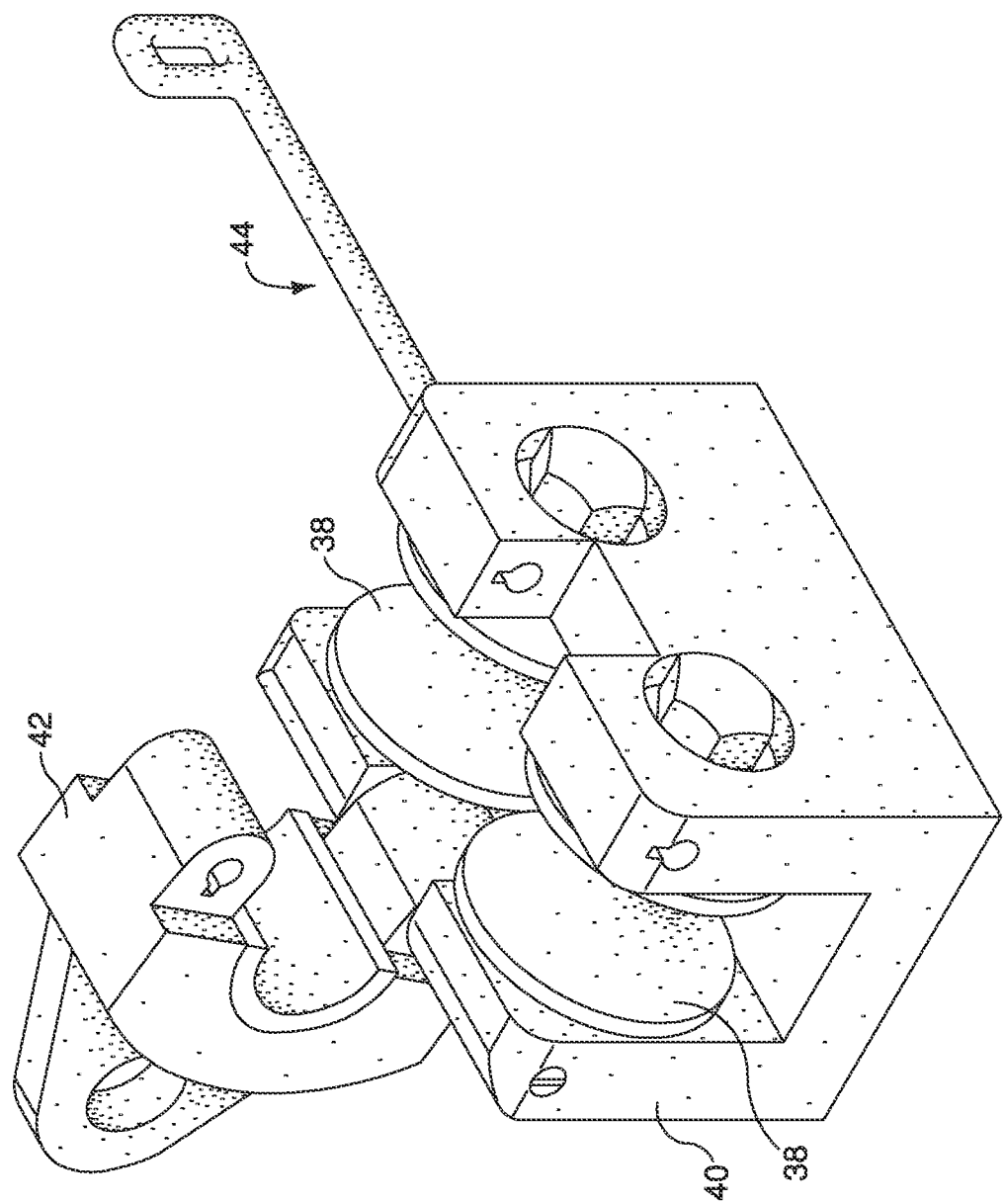
FIG. 16 is a perspective view of the conductor wire cage of FIG. 15 showing the pin in the open position to allow the gate to open or close.

Pin 44 may include a locking key protrusion 44a protruding from one end of the pin, and the bores 40c and 42c may be formed as a keyway so that when pin 44 is journaled through bores 40c and 42c, so that the end 44b of the pin 44 is protruding from one end of block 40, opposite from the handle end 44c of pin 44, the key protrusion 44a may be rotated out of alignment with the keyway so as to retain the pin in its locking position, thereby locking tab 42b into notch 40b. As seen in FIG. 16, the gate 42 is in its open position so as to receive a conductor down onto rollers 38.

Figure 16A:
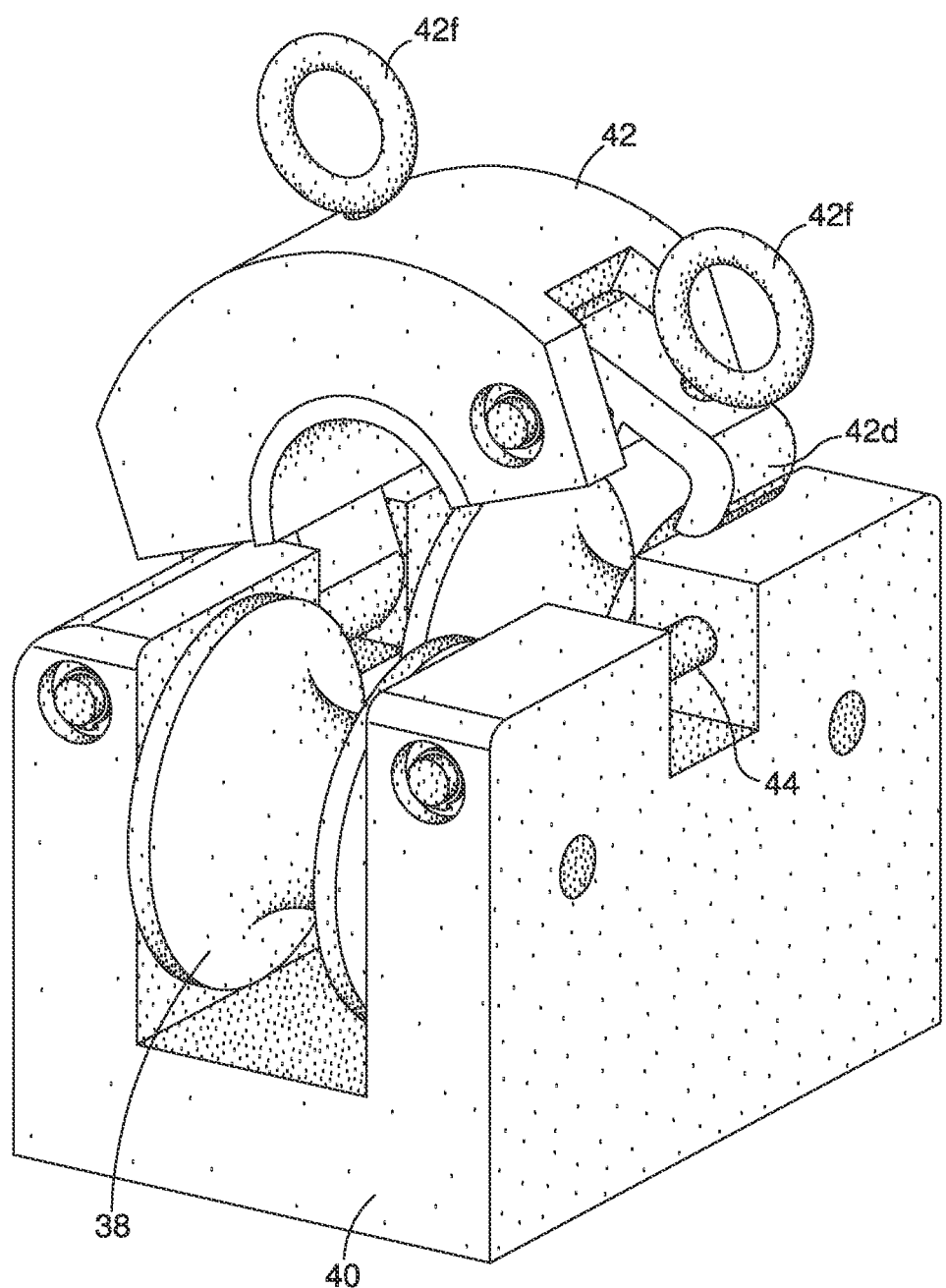
FIG. 16A is a perspective view of the conductor wire cage of FIG. 15A, showing the wire cage gate in a partially closed position with the latch in an open position for closing of the wire cage gate.

As seen in FIG. 16A, the wire cage gate 42 of FIG. 15A is in a partially closed position with the latch 42d in an open position so as to engage pin 44.

Figure 17:
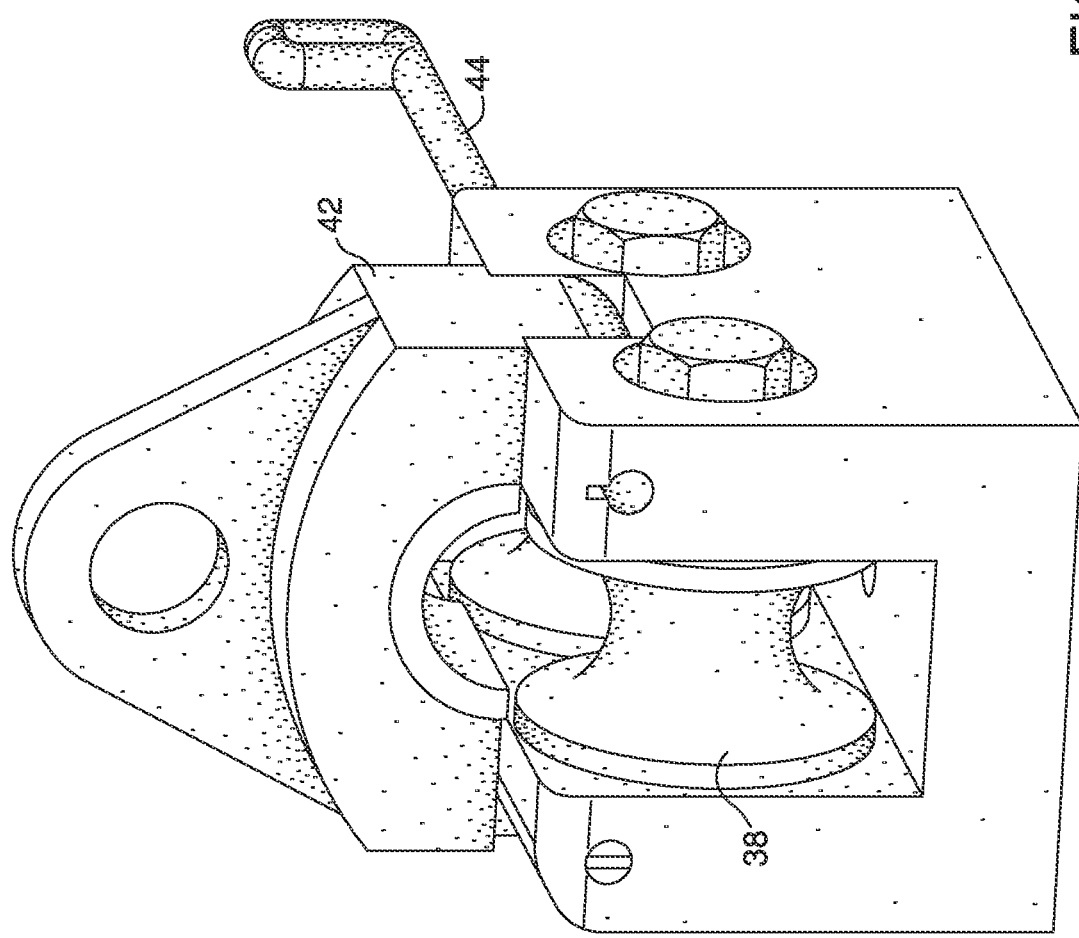
FIG. 17 is a perspective view of the conductor wire cage of FIG. 15, showing the wire cage gate in a closed position with the pin in the open position.

In FIG. 17 the wire cage gate 42 is in its closed position, but not yet locked, as it would be when a conductor was held on the rollers 38 and the gate 42 initially closed over the conductors.

Figure 17A:
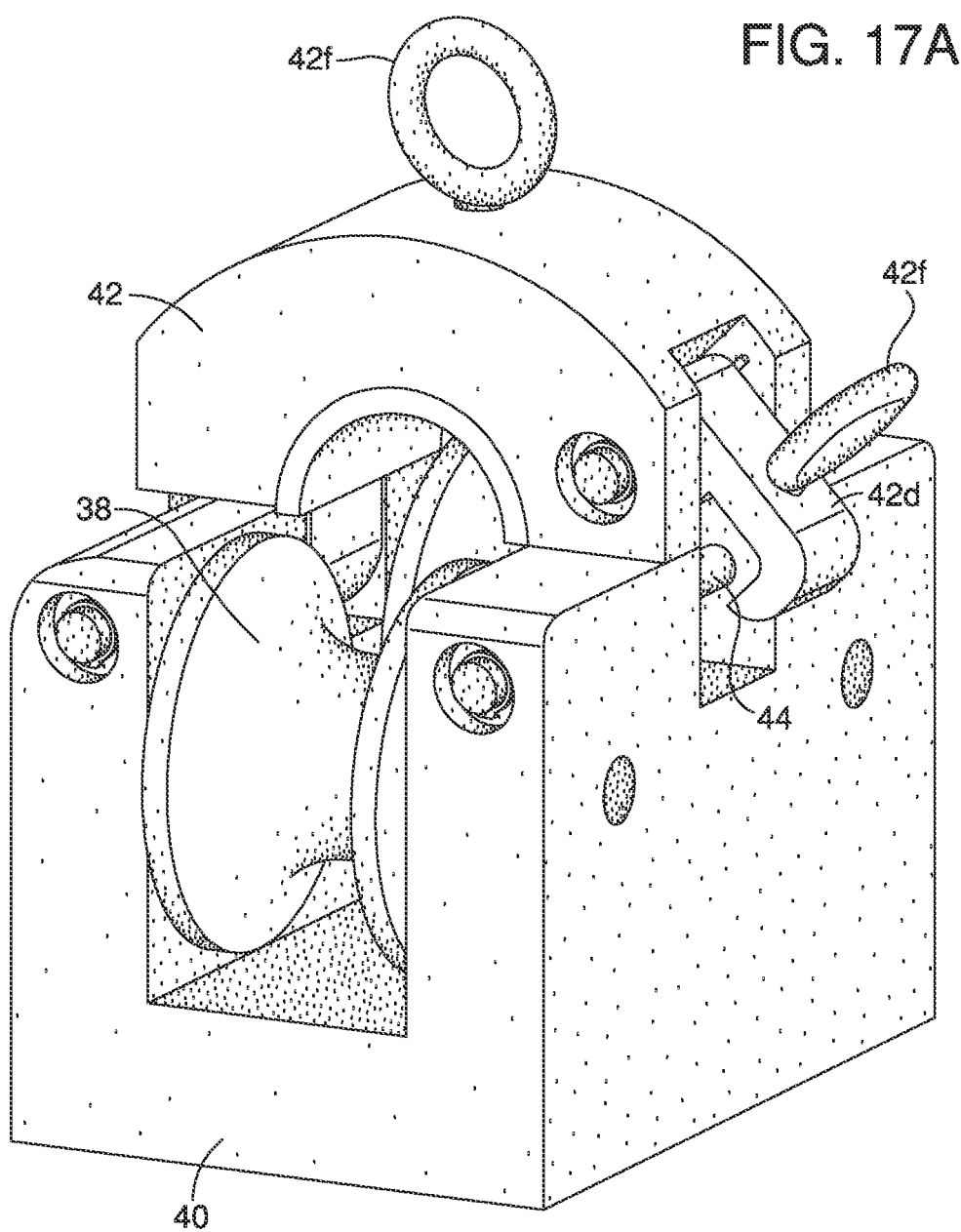
FIG. 17A is a perspective view of the conductor wire cage of FIG. 15A, showing the wire cage gate in a closed position with the latch in the open position.

In FIG. 17A the wire cage gate 42 is in its closed position with the latch 42d in the open position.

In FIG. 18 the pin 44 has been slid through bores 40c and 42c so as to lock the locking tab 42b into notch 40b. The pin 44 would then be locked into place by rotating the handle 44c in direction H, rotating the key protrusion 44a out of alignment with the keyway 44f through bores 40c and 42c, thereby preventing pin 44 from being removed inadvertently.

Figure 18A:
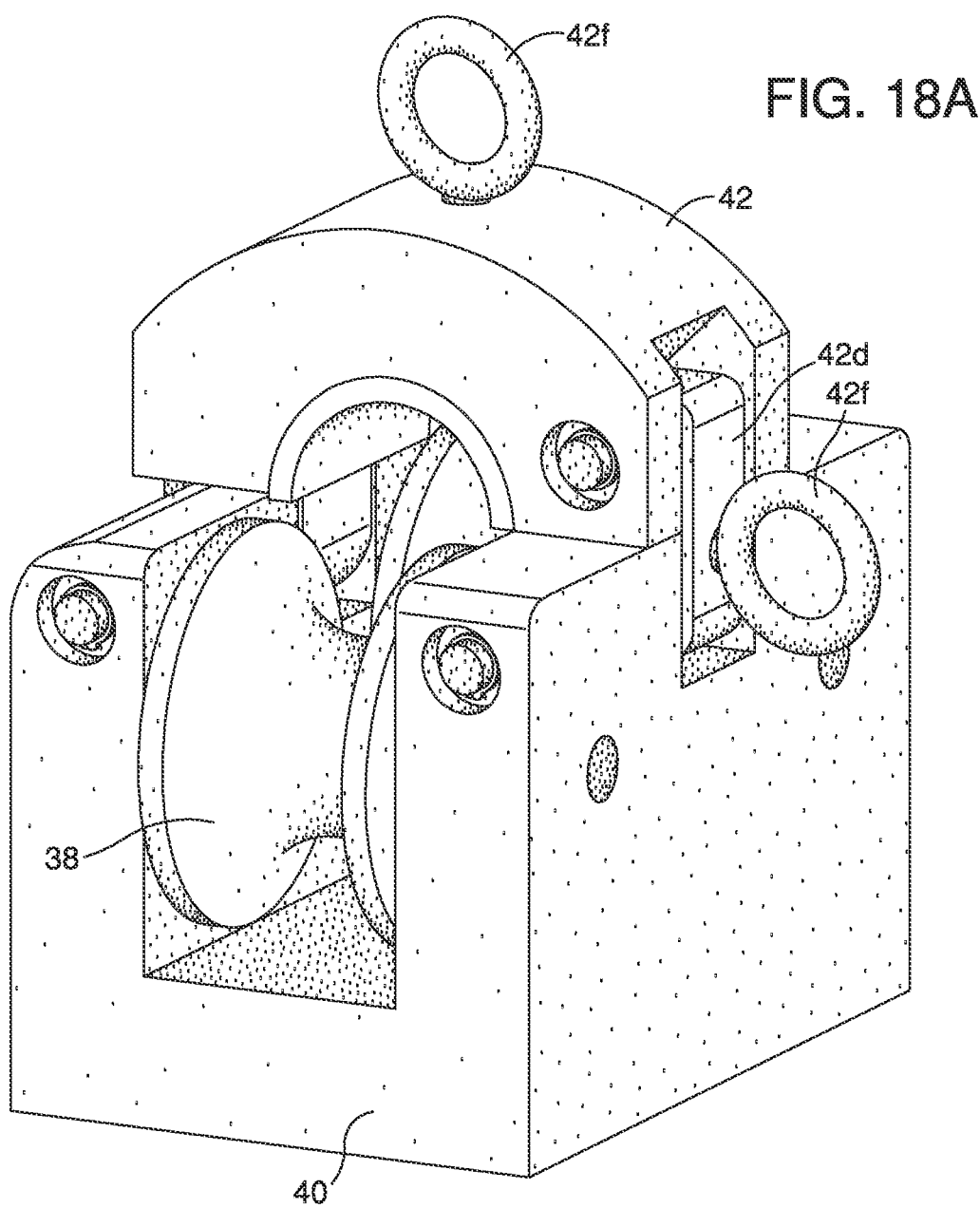
FIG. 18A is a perspective view of the conductor wire cage of FIG. 15A, showing the wire cage gate in a closed position with the latch in the closed position securing the wire cage gate.
Figure 18B:
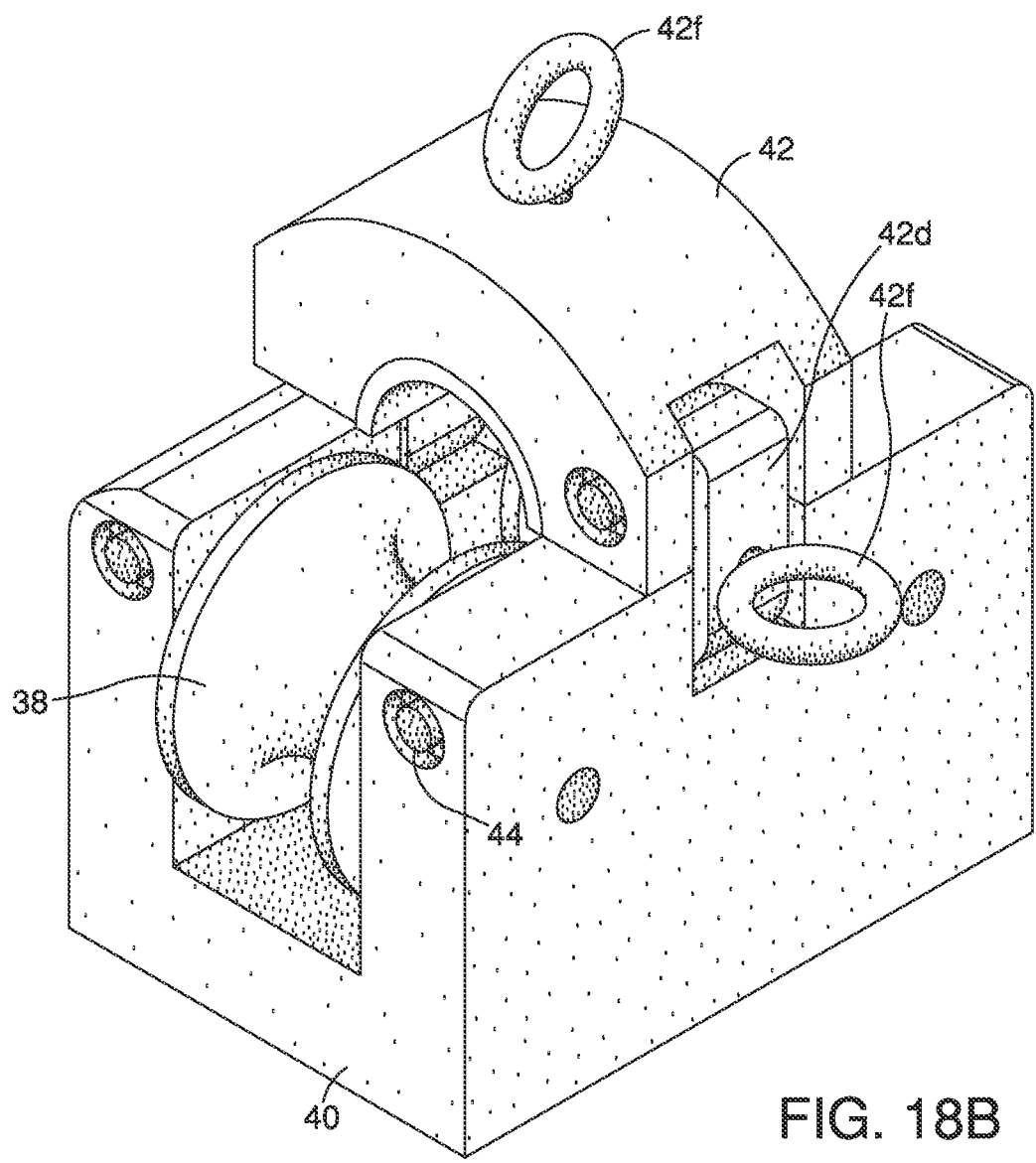
FIG. 18B is a perspective view of the conductor wire cage of FIG. 15A, showing the wire cage gate in a closed and latched position with the hotstick eyes rotated 90°, illustrating the rotation to ease the operation of the wire cage gate with an insulated hotstick.

In FIG. 18A the wire cage gate 42 of FIG. 15A is in its closed position, with the latch 42d also in the closed position so as to secure gate 42. In FIG. 18B the wire cage gate 42d is in its closed and latched position, with the hotstick eyes 42f rotated 90 degrees from their orientation in FIG. 18A, illustrating their rotation to ease the operation of the wire cage gate with an insulated hotstick.

Figure 19:
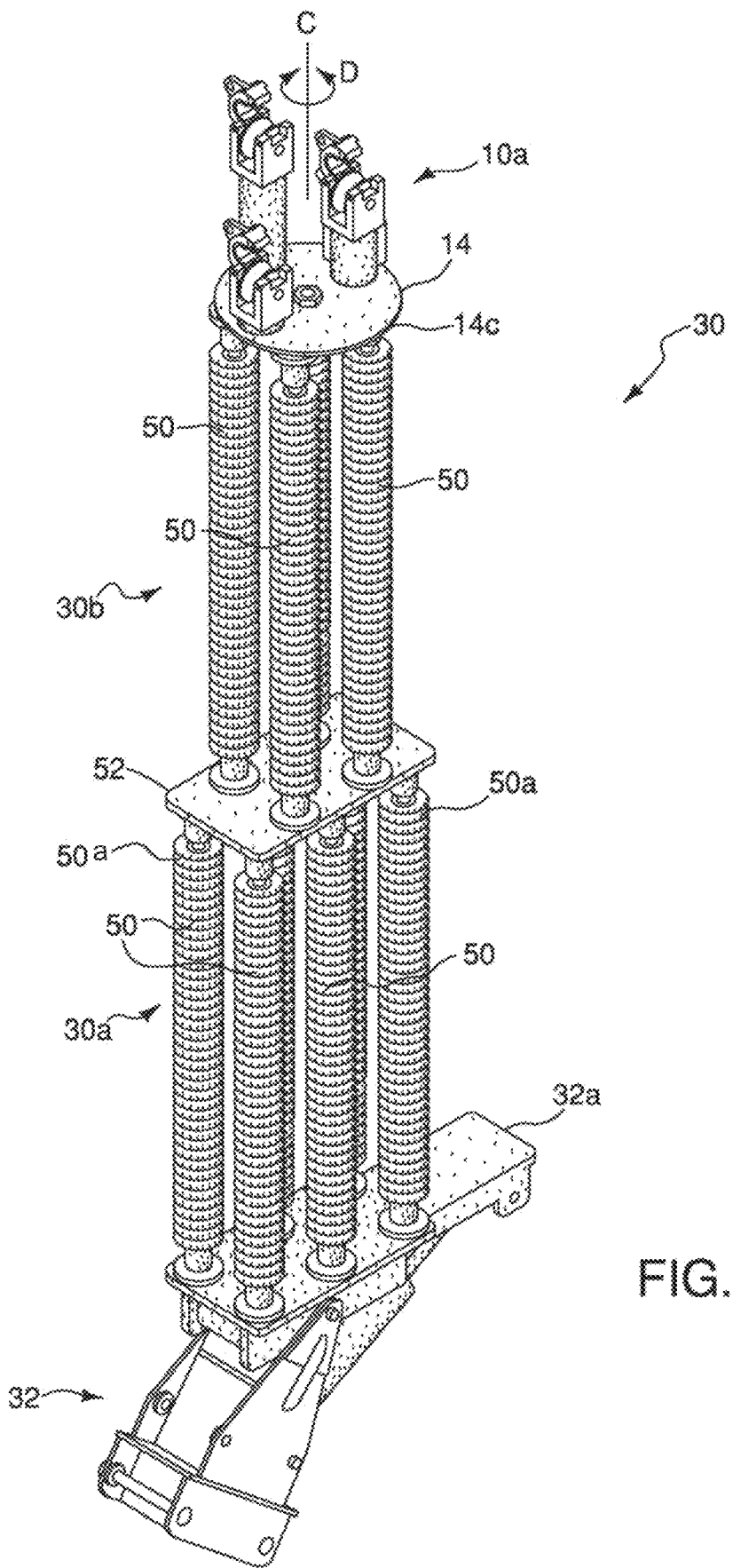
FIG. 19 is a perspective view of a three sub-conductor bundle lifter mounted on a stacked insulator assembly of a single point conductor lifter.

As seen in FIG. 19, a bundle wire holder, such as the three sub-conductor bundle wire holder of FIG. 7, may be mounted on a stack of insulators where the insulators may be stacked in order to support a very heavy loading, such as for example, 25,000 lbs. The bundle wire holder as described above, supports the sub-conductors in a sub-conductor bundle. Again, the wire cages may be double roller wire cages or single roller wire cages, as appropriate to support the load. The single point conductor lifter may be oriented to accommodate such as when the conductor lifter is positioned at an angle off the vertical. In one embodiment, insulator stack 30 includes a lower or first tier 30a and an upper or second tier 30b. The first tier 30a includes a plurality of parallel insulators 50 of equal length, arranged so as to extend orthogonally from an insulator adaptor base 32a of boom adaptor 32. For example, without intending to be limiting, the plurality of insulators 50 may include four or six insulators. The insulators 50 may be equally spaced apart, and arranged upon the insulator adapter base 32a in multiple rows. For example, the insulators 50 may be arranged in two rows of three insulators.

A transition plate 52 is mounted on the distal ends 50a of the plurality of insulators 50, distal from the boom adaptor 32. Transition plate 52 is fastened to secure a distal end 50a of each insulator 50 to the transition plate 52. The second tier 30b of the insulator stack 30 adds an additional set of a plurality of parallel insulators 50 to insulator stack 30. For example, without intending to be limiting, the second tier 30b may comprise two or four insulators 50. The insulators 50 are mounted spaced apart on the upper surface of the transition plate 52, and may be spaced apart by substantially the same distance as exists between the spaced apart insulators 50 on the first tier 30a in the insulator stack, arranged for example in a configuration of two rows of two insulators, or in other words, a 2×2 configuration.

As discussed above in respect of FIG. 19, three sub-conductor bundle wire holder 10a is mounted on the distal end 50a of the second tier 30b of insulators 50, distal from the transition plate 52. In one embodiment, the platform 14 may be mounted on a swivel plate 14c, thereby allowing for the three sub-conductor bundle wire holder 10a to rotate about the axis of rotation C in direction D while mounted on insulation stack 30. Although the illustrations herein show the three sub-conductor bundle holder 10a mounted to the distal end of the second tier 30b, it will be appreciated that the four sub-conductor bundle wire holder 10b, may also be mounted to the distal end 50a of insulator stack 30.

Figures 20A, 20B:
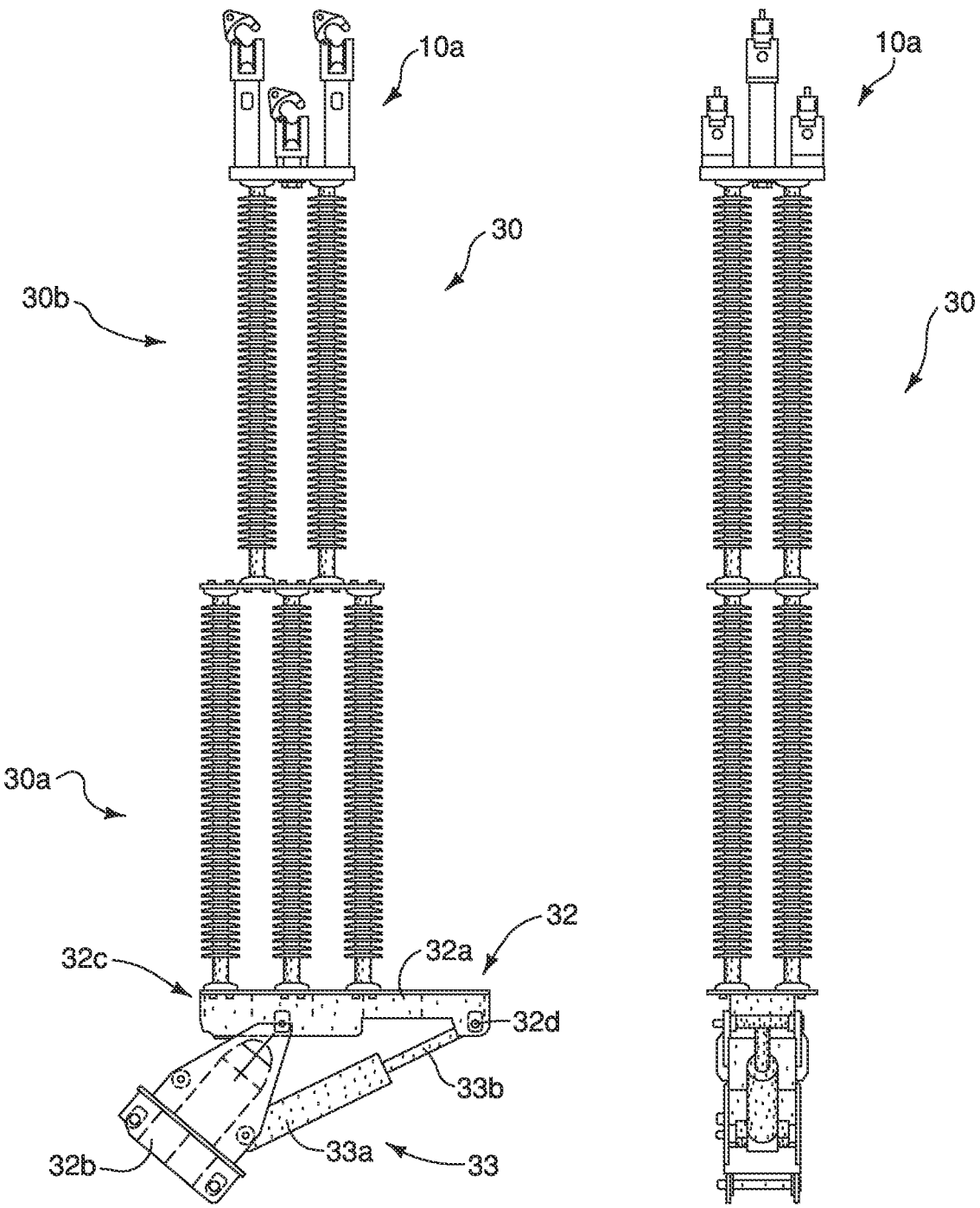
FIG. 20A is a side elevation view of the single point conductor lifter and bundle lifter of FIG. 19.
FIG. 20B is a front elevation view of the single point conductor lifter and bundle lifter of FIG. 19.

As better seen in FIG. 20A, boom adaptor 32 includes an insulator adaptor base 32a, which provides a support for the insulator stack 30. The insulator adaptor base 32a is pivotally attached to an jib adaptor 32b at a pivotal coupling 32c. A linear actuator 33, which for example may be a hydraulic cylinder, includes a cylinder 33a pivotally mounted to the jib adapter 32b at 32e shown at the base of the hydraulic cylinder in FIG. 20A. Cylinder rod 33b is pivotally mounted to the insulator adaptor base 32a at a pivotal coupling 32d, spaced apart from the pivotal coupling 32c between the insulator adapter base 32a and jib adapter 32b. Thus, the angle of the insulator stack 30 may be angled relative to the vertical by extending or retracting the cylinder rod 33b of the linear actuator 33.

Figure 21A:
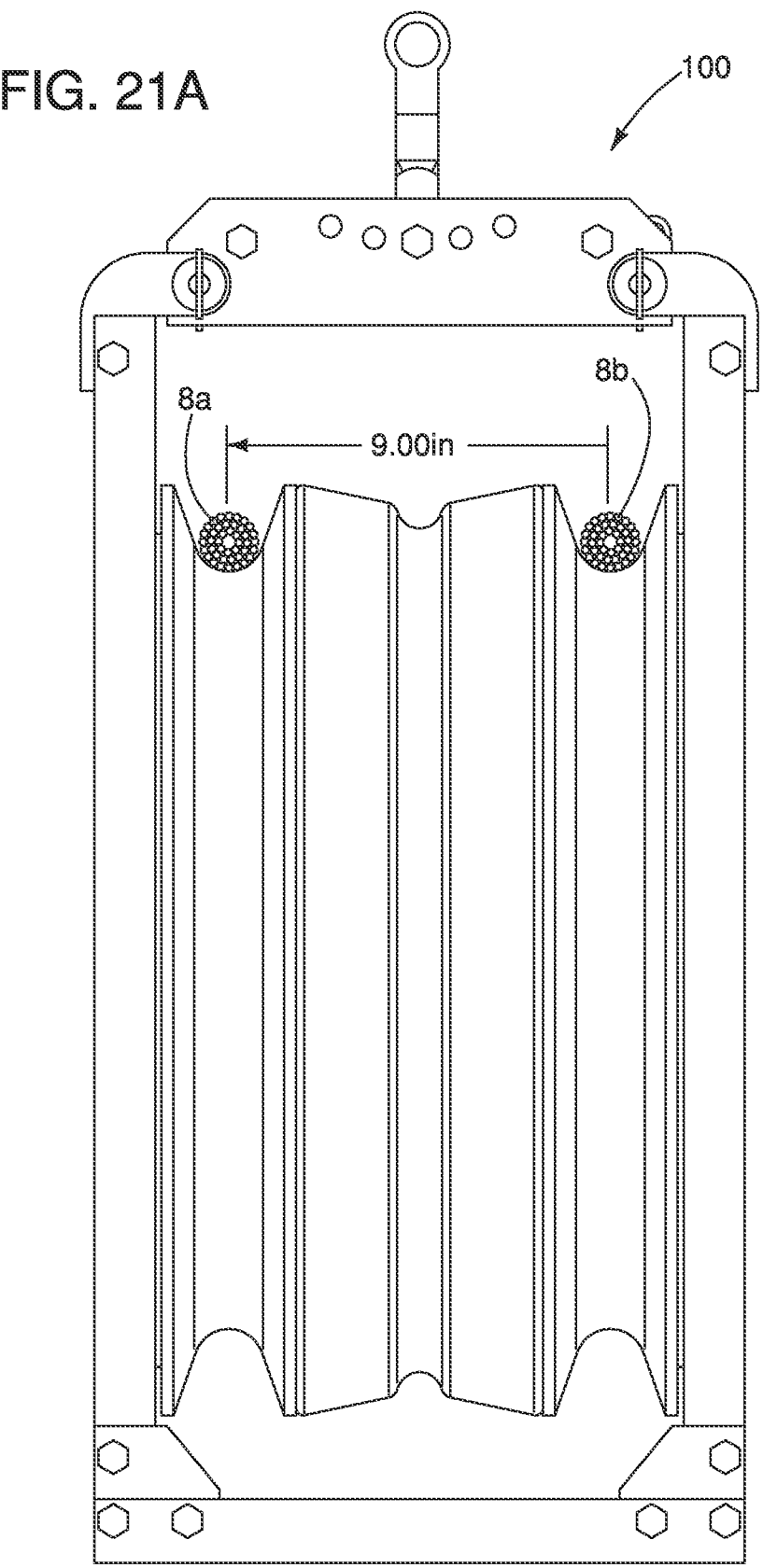
FIG. 21A illustrates a conventional bundle traveller.
Figure 21B:
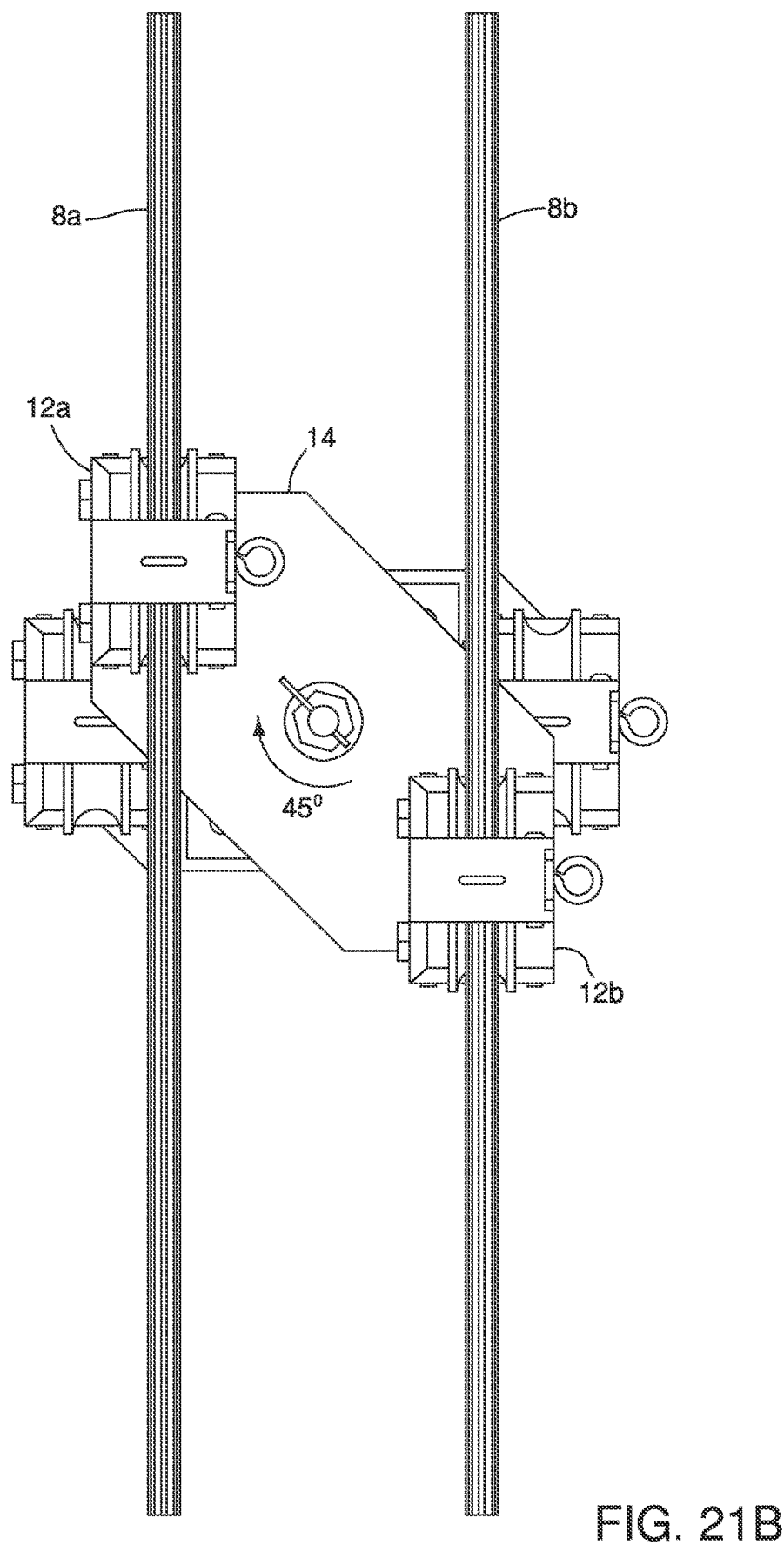
FIG. 21B illustrates a sub conductor bundle lifter according to the present disclosure rotated to reduce conductor spacing to fit into the spacing of the bundle traveller of FIG. 21A with a conductor spacing of 9 inches instead of 18 inches.

In some applications, and as illustrated in FIGS. 21A and 21B, it is advantageous to be able to adjust the position of the wire cages to accommodate the reduced spacing between conductors passing through a traveler 100. Rather than for example an 18 inch spacing between sub-conductors, as seen in FIG. 21A, the spacing when passing through a traveler may be less than half that. Consequently, if a bundle wire lifter has wire cages pre-set at 18 inches apart, then that bundle wire lifter will not be able to pick both sub-conductors simultaneously out of the traveler. Consequently, in order to do so both of the three and four bundle wire lifters described herein may, as seen by the way of example showing only two wire cages in FIG. 21B, be rotated, and the orientation of the wire cages adjusted, to be able to pick sub-conductors having reduced spacing such as may occur when picking sub-conductors out of a traveler. In the case of the three bundle wire lifter of FIG. 6, base 14 would be rotated for example by 45 degrees so as to displace posts 14a, and thus wire cages 12a and 12b, also by 45 degrees relative to the direction of the sub-conductors to be picked. Wire cages 12a and 12b are then re-aligned so as to align with the sub-conductors for pick up of the sub-conductors in the wire cages. In the case of the four bundle wire lifter of FIG. 9, only—the support arm 18 needs to be rotated 45 degrees and wire cages 20a and 20b re-aligned.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:
1. A bundle lifter for lifting and moving a three sub-conductor bundle, having spaced-apart sub-conductors either in a two high one low configuration or in a one high two low configuration, from an original position to a new position, spaced from the original position, the bundle lifter adapted for mounting to a single point conductor lifter having at least one tier of parallel elongate insulators and comprising:
- a platform having opposite first and second surfaces, the first surface adapted for rotational mounting onto a distal end of the at least one tier of parallel elongate insulators;
- four sub-conductor wire cages mounted to the second surface of the platform, each wire cage having at least one roller adapted to support a corresponding sub-conductor from the three sub-conductor bundle thereon, each wire cage adapted to releasably hold the corresponding sub-conductor and to swivel about an axis that is orthogonal to a plane containing the platform;
- wherein, when the wire cages are positioned under the three sub-conductor bundle, the wire cages are swivelable to align their corresponding at least one rollers with their corresponding sub-conductors from the three sub-conductor bundle for rolling support of the sub-conductors on the at least one rollers as the bundle lifter is elevated on the single point conductor lifter upwards from under the three sub-conductor bundle to pick each sub-conductor in the three sub-conductor bundle into its corresponding wire cage for repositioning of the three sub-conductor bundle from the original position to the new position;
- wherein the platform has a perimeter and the four wire cages are mounted substantially equally spaced around the perimeter edge in a sequential order, first, second, third, and fourth wire cages;
- wherein the second and fourth wire cages are mounted to the second surface of the platform and the first and third wire cages are mounted on posts on the second surface of the platform so as to elevate the first and third wire cages above the second and fourth wire cages;
- wherein, when the bundle lifter is in a first platform orientation for picking the three sub-conductor bundle having the two high one low configuration, including two high sub-conductors and one low sub-conductor, the second and fourth wire cages are located between the first and third wire cages, and the first and third wire cages are aligned and positioned to engage the two high sub-conductors and the second and fourth wire cages are aligned and positioned to engage the one low sub-conductor, and
- wherein, when the bundle lifter is in a second platform orientation, rotated substantially 90 degrees from the first platform orientation in the second plane containing the platform, for picking the three sub-conductor bundle having the one high two low configuration, including one high sub-conductor and two low sub-conductors, the first and third wire cages are located between the second and fourth wire cages, and the first and third wire cages are aligned and positioned to engage the one high sub-conductor and the second and fourth wire cages are aligned and positioned to engage the two low sub-conductors.

2. The bundle lifter of claim 1, wherein the at least one roller includes a pair of rollers.

3. The bundle lifter of claim 1, wherein the posts extend orthogonally from the second surface of the platform.

4. The bundle lifter of claim 1, wherein the mounting of the second and fourth wire cages is selected from a group consisting of mounted on the second surface of the platform, and mounted on a bracket, wherein the bracket is mounted on the second surface of the platform.

5. The bundle lifter of claim 1, wherein the platform is mounted on a plate which is adapted to be mounted to the distal end of the at least one tier of parallel elongate insulators of the single point conductor lifter, and wherein the plate and the platform are adapted to swivel relative to one another.

6. A system for lifting and moving a three sub-conductor bundle, having spaced-apart sub-conductors either in a two high one low configuration or in a one high two low configuration, from an original position to a new position, spaced from the original position, using the bundle lifter of claim 1, wherein the system is mountable to a distal end of a boom and comprises:
- a boom adaptor configured for mounting onto the distal end of the boom at its one end;
- the single point conductor lifter, wherein the single point conductor lifter is configured for mounting to a second end of the boom adaptor, and wherein the single point conductor lifter comprises the at least one tier of parallel elongate insulators, and wherein the at least one tier of parallel elongate insulators, in an operative position of the system, extends away from the second end of the boom adaptor so as to locate a distal end thereof away from the second end of the boom adaptor; and
- the bundle lifter of claim 1 configured for mounting to the distal end of the at least one tier of parallel elongate insulators.

7. The system of claim 6, wherein the at least one tier of parallel elongate insulators comprises stacked first and second tiers of insulators, wherein the first tier comprises a first set of insulators, the first set having a crane or truck boom end mounted to the second end of the boom adaptor and a tier end mounted to the second tier, and wherein the second tier comprises a second set of insulators, the second set having a tier end mounted to the first tier and a distal end mounted to the first surface of the platform.

8. The system of claim 7, wherein a number of insulators in the first set is greater than a number of insulators in the second set.

9. The system of claim 7, wherein each set of insulators of the first and second sets is each arranged in a matrix, each matrix comprising at least two rows and two columns.

10. The system of claim 9, wherein the matrix of the first set of insulators comprises two rows and three columns and the matrix of the second set of insulators comprises two rows and two columns.

11. A method for lifting and moving a three sub-conductor bundle, having spaced-apart sub-conductors either in a two high one low configuration or in a one high two low configuration, from an original position to a new position, spaced from the original position, using the bundle lifter of claim 1, the method comprising:
- providing the bundle lifter of claim 1;
- positioning the bundle lifter, in the first platform orientation, adjacent and under the three sub-conductor bundle, when the three sub-conductor bundle is in the original position and in the two high one low configuration, so as
- to position the first and third wire cages under and into cooperating alignment with the two high sub-conductors, and the second and fourth wire cages under and into cooperating alignment with the one low sub-conductor;

receiving and retaining the two high sub-conductors in the first and third wire cages and receiving and retaining the one low sub-conductor in the second and fourth wire cages; and repositioning the bundle lifter so as to lift and move the three sub-conductor bundle from the original position to the new position.

12. The method of claim 11 further comprising:

mounting the posts so that they extend orthogonally from the second surface of the platform; and swivelably mounting the first and third wire cages on the posts.

13. The method of claim 11 further comprising mounting the second and fourth wire cages directly to the second surface of the platform or through a bracket mounted to the second surface of the platform.

14. The method of claim 11, to move and lift the three sub-conductor bundle when the sub-conductor bundle is in the one high two low configuration, further comprising:

rotating the bundle lifter into the second platform orientation;

positioning the bundle lifter adjacent and under the three sub-conductor bundle, when the three sub-conductor bundle is in the original position, so as;

to position the first and third wire cages under and into cooperating alignment with the one high sub-conductor, and the second and fourth wire cages under and into cooperating alignment with the two low sub-conductors;

receiving and retaining the one high sub-conductor in the first and third wire cages and receiving and retaining the two low sub-conductors in the second and fourth wire cages; and repositioning the bundle lifter so as to lift and move the three sub-conductor bundle from the original position to the new position.

* * * * *